US011572470B2

(12) United States Patent
He et al.

(10) Patent No.: US 11,572,470 B2
(45) Date of Patent: Feb. 7, 2023

(54) MATERIALS FOR AUTONOMOUS TRACKING, GUIDING, MODULATING, AND HARVESTING OF ENERGETIC EMISSIONS

(71) Applicant: The Regents of the University of California, Oakland, CA (US)

(72) Inventors: Ximin He, Los Angeles, CA (US); Xiaoshi Qian, Mountain View, CA (US)

(73) Assignee: The Regents of the University of California, Oakland, CA (US)

( * ) Notice: Subject to any disclaimer, the term of this patent is extended or adjusted under 35 U.S.C. 154(b) by 404 days.

(21) Appl. No.: 16/604,502

(22) PCT Filed: Apr. 11, 2018

(86) PCT No.: PCT/US2018/027148
§ 371 (c)(1),
(2) Date: Oct. 10, 2019

(87) PCT Pub. No.: WO2018/191403
PCT Pub. Date: Oct. 18, 2018

(65) Prior Publication Data
US 2020/0148873 A1    May 14, 2020

Related U.S. Application Data

(60) Provisional application No. 62/484,269, filed on Apr. 11, 2017.

(51) Int. Cl.
*C08L 83/04* (2006.01)
*C08K 3/08* (2006.01)
(Continued)

(52) U.S. Cl.
CPC ............. *C08L 83/04* (2013.01); *C08K 3/08* (2013.01); *C08K 5/23* (2013.01); *C08K 5/3417* (2013.01);
(Continued)

(58) Field of Classification Search
CPC ............. G02B 19/00; G02B 19/0033; G02B 19/0038; G02B 19/0042; G02B 19/0047;
(Continued)

(56) References Cited

U.S. PATENT DOCUMENTS 9,229,218 B2 * 1/2016 Aizenberg ......... B29D 11/0074
2010/0052196 A1 * 3/2010 Yasuda ................... F03G 7/005
526/312
(Continued)

FOREIGN PATENT DOCUMENTS

CN         201865263 U     6/2011
WO      2006055707 A2     5/2006
(Continued)

OTHER PUBLICATIONS

Gopalakrishna, "Artificial Phototropism Based on a Photo-Thermo-Responsive Hydrogel", Thesis, Arizona State University, May 2016, 68 pgs. (Year: 2016).*
(Continued)

*Primary Examiner* — Stephone B Allen
*Assistant Examiner* — Adam W Booher
(74) *Attorney, Agent, or Firm* — KPPB LLP

(57) ABSTRACT

Tropistic materials incorporating a class of adaptively configurable materials capable of real-time detection, tracking, and processing incident stimulus are provided. Incident stimulus can comprise any energetic emission or signals, such as electromagnetic waves, acoustics waves, or magnetic fields. The materials comprise a deformable stimuli-responsive material, which can adapt configuratively to a
(Continued)

specific stimulus, and may further comprise a plurality of absorbers or photo-sensitive molecules configured to convert external incident stimuli to the specific stimulus type toward which the deformable material is responsive.

11 Claims, 28 Drawing Sheets

(51) Int. Cl.
    C08K 5/23    (2006.01)
    C08K 5/3417    (2006.01)
    C08L 33/12    (2006.01)
    G02B 6/122    (2006.01)
    G02B 1/04    (2006.01)

(52) U.S. Cl.
    CPC ............... *C08L 33/12* (2013.01); *G02B 1/04* (2013.01); *G02B 6/1221* (2013.01); *C08K 2003/0831* (2013.01); *C08K 2201/011* (2013.01); *G02B 2207/107* (2013.01)

(58) Field of Classification Search
    CPC ............ G02B 19/0052; G02B 19/0076; G02B 19/0085; G02B 26/08; G02B 26/103; G02B 6/35; G02B 6/1221; G02B 27/0081; G02B 1/04; G02B 2207/107; G02B 1/00; G02B 1/002; G02B 1/045–048; G02B 19/0004; G02B 6/02033; G02B 6/0229; G02B 6/287; G02B 6/3502; G02B 6/3504; G02B 6/3576; G02B 26/00; G02B 26/0866; G02F 3/00–028; G02F 1/0072; G02F 1/0063; G02F 1/009; G02F 1/29; G02F 1/0147; G02F 1/0009; H02S 40/20; C08L 83/04; C08L 33/12; C08K 3/08; C08K 5/23; C08K 5/3417; C08K 2003/0831; C08K 2201/011
    USPC ...................... 385/4–5, 12–13, 141, 144–145
    See application file for complete search history.

(56) References Cited

U.S. PATENT DOCUMENTS

2015/0093823 A1\* 4/2015 Sutton .................... C12M 35/04
                                                      435/375
2016/0158754 A1\* 6/2016 Ziolkowski ................ C08J 9/26
                                                      521/149

FOREIGN PATENT DOCUMENTS

WO        2006118077 A1    11/2006
WO        2018191403 A1    10/2018

OTHER PUBLICATIONS

International Preliminary Report on Patentability for International Application PCT/US2018/027148, Report dated Oct. 15, 2019, dated Oct. 24, 2019, 7 pgs.

International Search Report and Written Opinion for International Application No. PCT/US2018/027148, Search completed Jul. 3, 2018, dated Jul. 18, 2018, 13 pgs.

Ahir et al., "Photomechanical actuation in polymer-nanotube composites", Nature Materials, May 8, 2005, vol. 4, pp. 491-495, doi: 10.1038/nmat1391.

Alboteanu et al., "Positioning systems for solar panels placed in isolated areas", 2006, Annals of the University of Cralova, Electrical Engineering Series, No. 30, pp. 163-168.

Atamian et al., "Circadian regulation of sunflower heliotropism, floral orientation, and pollinator visits", Science, Aug. 5, 2016, vol. 353, No. 6299, pp. 587-590, doi: 10.1126/science.aaf9793.

Batchelor, "Slender-body theory for particles of arbitrary cross-section in Stokes flow", Journal of Fluid Mechanics, Nov. 26, 1970, vol. 44, No. 3, pp. 419-440, doi: 10.1017/S002211207000191X.

Chandler, "Sun-tracking device wins student prize", TechTalk, Sep. 24, 2008, vol. 53, No. 3, p. 6.

Chen et al., "A durable monolithic polymer foam for efficient solar steam generation", Chemical Science, 2018, vol. 9, pp. 623-628, doi: 10.1039/C7SC02967E, Open Access Article published Nov. 1, 2017.

Chen et al., "Fabrications and Applications of Stimulus-Responsive Polymer Films and Patterns on Surfaces: A Review", Materials, 2014, vol. 7, No. 2, pp. 805-875, doi: 10.3390/ma7020805.

Chen et al., "Highly Flexible and Efficient Solar Steam Generation Device", Advanced Materials, Jun. 12, 2017, vol. 29, No. 30, 1701756, 8 pgs., doi: 10.1002/adma.201701756.

Christianson et al., "Translucent soft robots driven by frameless fluid electrode dielectric elastomer actuators", Science Robotics, Apr. 25, 2018, vol. 3, No. 17, eaat1893, 8 pgs., doi: 10.1126/scirobotics.aat1893.

Dreyfus et al., "Microscopic artificial swimmers", Nature, Oct. 6, 2005, vol. 43716, No. 7060, pp. 862-865, doi: 10.1038/nature04090.

Duan et al., "Simulation of the Transient Behavior of Gels Based on an Analogy Between Diffusion and Heat Transfer", Journal of Applied Mechanics, Jul. 2013, vol. 80, No. 4, pp. 041017-1-041017-5, doi: 10.1115/1.4007789.

Floreano et al., "Science, technology and the future of small autonomous drones", Nature, May 28, 2015, vol. 521, pp. 460-466, doi: 10.1038/nature14542.

Gelebart et al., "Making waves in a photoactive polymer film", Nature, Jun. 28, 2017, vol. 546, No. 7660, pp. 632-636, doi: 10.1038/nature22987.

Gelebart et al., "Mastering the Photothermal Effect in Liquid Crystal Networks: A General Approach for Self-Sustained Mechanical Oscillators", Advanced Materials, Feb. 22, 2017, vol. 29, No. 18, 1606712, 6 pgs., doi: 10.1002/adma.201606712.

Gelebart et al., "Photoresponsive Fiber Array: Toward Mimicking the Collective Motion of Cilia for Transport Applications", Advanced Functional Materials, May 23, 2016, vol. 26, No. 29, pp. 5322-5327, doi: 10.1002/adfm.201601221.

Ghasemi et al., "Solar steam generation by heat localization", Nature Communications, Jul. 21, 2014, vol. 5, No. 4449,7 pgs., doi: 10.1038/ncomms5449.

Gopalakrishna, "Artificial Phototropism Based on a Photo-Thermo-Responsive Hydrogel", Thesis, Arizona State University, May 2016, 68 pgs.

Gorostiza et al., "A decision underlies phototaxis in an insect", Open Biology, 2016, vol. 6, 160229, pp. 1-16, doi: 10.1098/rsob.160229.

Greffet et al., "Coherent emission of light by thermal sources", Nature, Mar. 7, 2002, vol. 416, pp. 61-64, doi: 10.1038/416061a.

Hamilton, "SunSaluter, developed by 19-year-old Canadian Eden Full, could lower cost of solar PV for world's poorest", Cleanbreak, Jun. 10, 2011, Retrieved from the Internet http://www.cleanbreak.ca/2011/06/10/sunsaluter-developed-by-19-year-old-canadian-eden-full-could-lower-cost-of-solar-pv-for-worlds-poorest/, 3 pgs.

He et al., "Synthetic homeostatic materials with chemo-mechano-chemical self-regulation", Nature, Jul. 12, 2012, vol. 487, pp. 214-218, doi: 10.1038/nature11223.

Hong et al., "A theory of coupled diffusion and large deformation in polymeric gels", Journal of the Mechanics and Physics of Solids, May 2008, vol. 56, No. 5, pp. 1779-1793, doi: 10.1016/j.jmps.2007.11.010.

Horvath, "Chemomechanical oscillations with a non-redox non-oscillatory reaction", Chemical Communications, Apr. 12, 2017, vol. 53, No. 36, pp. 4973-4976, doi: 10.1039/C7CC02497E.

Huang et al., "Energy harvesting using RF MEMS", 2010 Proceedings 60th Electronic Components and Technology Conference (ECTC), pp. 1353-1358, Jun. 21, 2010, doi:10.1109/ECTC.2010.5490638.

(56) References Cited

OTHER PUBLICATIONS

Huang et al., "Harnessing structural darkness in the visible and infrared wavelengths for a new source of light", Nature Nanotechnology, Jan. 2016, vol. 11, pp. 60-66, published online Oct. 19, 2015, doi: 10.1038/nnano.2015.228.

Huang et al., "Miniaturized Swimming Soft Robot with Complex Movement Actuated and Controlled by Remote Light Signals", Scientific Reports, Dec. 3, 2015, vol. 5, No. 17414, pp. 1-8, doi: 10.1038/srep17414.

Jain et al., "Tunable LCST behavior of poly (N-isopropylacrylamide/ionic liquid) copolymers", Polymer Chemistry, 2015, 6(38), 6819-6825, doi: 10.1039/C5PY00998G.

Jekely et al., "Mechanism of phototaxis in marine zooplankton", Nature, Nov. 20, 2008, vol. 456, No. 7220, pp. 395-399, doi: 10.1038/nature07590.

Katsuki et al., "Jellyfish nervous systems", Current Biology, 2013, vol. 23, No. 14, pp. R592-R594.

Kim et al., "Thermoresponsive actuation enabled by permittivity switching in an electrostatically anisotropic hydrogel", Nature Materials, Oct. 2015, vol. 14, No. 10, pp. 1002-1007, published online Aug. 10, 2015, doi: 10.1038/nmat4363.

Kirmani et al., "First-Photon Imaging", Science, Jan. 3, 2014, vol. 343, No. 6166, pp. 58-61, doi: 10.1126/science.1246775.

Kizilkan et al., "Bioinspired photocontrollable microstructured transport device", Science Robotics, Jan. 18, 2017, vol. 2, No. 2, eaak9454, pp. 1-6, doi: 10.1126/scirobotics.aak9454.

Klajn, "Spiropyran-based dynamic materials", Chemical Society Reviews, Aug. 27, 2013, vol. 43, pp. 148-184, doi: 10.1039/C3CS60181A.

Koerner et al., "Photogenerating work from polymers", Materials Today, Jul.-Aug. 2008, vol. 11, No. 7-8, pp. 34-42, doi: 10.1016/S1369-7021(08)70147-0.

Kruse et al., "Oscillations in cell biology", Current Opinion in Cell Biology, Feb. 2005, vol. 17, No. 1, pp. 20-26, doi: 10.1016/j.ceb.2004.12.007.

Kumar et al., "A chaotic self-oscillating sunlight-driven polymer actuator", Nature Communications, Jul. 4, 2016, vol. 7, No. 11975, doi: 10.1038/ncomms11975.

Lee et al., "Bio-inspired responsive polymer pillar arrays", MRS Communications, Jun. 2015, vol. 5, No. 2, pp. 97-114, published online Apr. 22, 2015, https://doi.org/10.1557/mrc.215.18.

Lee et al., "Photodriven, flexural-torsional oscillation of glassy azobenzene liquid crystal polymer networks", Advanced Functional Materials, Jun. 7, 2011, vol. 21, No. 15, pp. 2913-2918, doi: 10.1002/adfm.201100333.

Lee et al., "Photothermally driven fast responding photo-actuators fabricated with comb-type hydrogels and magnetite nanoparticles", Scientific Reports, Oct. 13, 2015, vol. 5, No. 15124, pp. 1-8, doi: 10.1038/srep15124.

Li et al., "Direct Sun-Driven Artificial Heliotropism for Solar Energy Harvesting Based on a Photo-Thermomechanical Liquid-Crystal Elastomer Nanocomposite", Advanced Functional Materials, Aug. 1, 2012, vol. 22, No. 24, pp. 5166-5174, doi: 10.1002/adfm.201202038.

Li et al., "Graphene oxide-based efficient and scalable solar desalination under one sun with a confined 2D water path", Proceedings of the National Academy of Sciences USA, Dec. 6, 2016, vol. 113, No. 49, pp. 13953-13958, doi: 10.1073/pnas.1613031113.

Lighthill et al., "Note on the swimming of slender fish", Journal of Fluid Mechanics, Oct. 1960, vol. 9, No. 2, pp. 305-317, doi: 10.1017/S0022112060001110.

Liu et al., "Hybrid metamaterials for electrically triggered multifunctional control", Nature Communications, Oct. 27, 2016, vol. 7, No. 13236, doi: 10.1038/ncomms13236.

Liu et al., "Reversible and Rapid Laser Actuation of Liquid Crystalline Elastomer Micropillars with Inclusion of Gold Nanoparticles", Advanced Functional Materials, Apr. 9, 2015, vol. 25, No. 20, pp. 3022-3032, doi: 10.1002/adfm.201500443.

Lubitz, "Effect of manual tilt adjustments on incident irradiance on fixed and tracking solar panels", Applied Energy, May 2011, vol. 88, No. 5, pp. 1710-1719, available online Dec. 9, 2010, doi: j.apenergy.2010.11.008.

Lyne et al., "The Lovell Telescope and its role in pulsar astronomy", Nature Astronomy, Dec. 2017, vol. 1, pp. 835-840, doi: 10.1038/s41550-017-0292-0.

Maeda et al., "Self-walking gel", Advanced Materials, Oct. 16, 2007, vol. 19, No. 21, pp. 3480-3484, doi: 10.1002/adma.200700625.

Palagi et al., "Structured light enables biomimetic swimming and versatile locomotion of photoresponsive soft microrobots", Nature Materials, Feb. 15, 2016, vol. 15, pp. 647-653, doi: 10.1038/nmat4569.

Poppinga et al., "Toward a New Generation of Smart Biomimetic Actuators for Architecture", Advanced Materials, Oct. 24, 2017, vol. 30, 1703653, No. 19, 10 pgs., doi: 10.1002/adma.201703653.

Puangmali et al., "State-of-the-art in force and tactile sensing for minimally invasive surgery", IEEE Sensors Journal, Apr. 2008, Published Feb. 15, 2008, vol. 8, No. 4, pp. 371-381, doi: 10.1109/JSEN.2008.917481.

Qiu et al., "Swimming by reciprocal motion at low Reynolds number", Nature communications, Nov. 4, 2014, vol. 5, No. 5119, pp. 1-8, doi: 10.1038/ncomms6119.

Rothemund et al., "A soft, bistable valve for autonomous control of soft actuators", Science Robotics, Mar. 21, 2018, vol. 3., No. 16, pp. 1-10, eaar7986, doi: 10.1126/scirobotics.aar7986.

Schild, "Poly(N-isopropylacrylamide): experiment, theory and application", Progress in Polymer Science, 1992, vol. 17, No. 2, pp. 163-249, doi: 10.1016/0079-6700(92)90023-R.

Serak et al., "Liquid crystalline polymer cantilever oscillators fueled by light", Soft Matter, 2010, vol. 6, No. 4, pp. 779-783, published as an Advance Article on the web on Dec. 23, 2009, doi: 10.1039/B916831A.

Shin et al., "Hygrobot: A self-locomotive ratcheted actuator powered by environmental humidity", Science Robotics, Jan. 24, 2018, vol. 3, No. 14, eaar2629, pp. 1-8, doi: 10.1126/scirobotics.aar2629.

Stumpel et al., "Stimuli-responsive photonic polymer coatings", Chemical Communications, 2014, vol. 50, pp. 15839-15848, doi: 10.1039/C4CC05072J.

Tan et al., "Resonant Nonlinearities of Macro-Fiber Composite Cantilevers in Energy Harvesting", American Society of Mechanical Engineers, 2017 Conference on Smart Materials, Adaptive Structures and Intelligent Systems, Nov. 9, 2017, pp. V001T07A013-V001T07A013, doi: 10.1115/SMASIS2017-3931.

Tayel et al., "A novel design of a MEMS solar cell based on microcantilever-photoinduced bending", 2012 First International Conference on Innovative Engineering Systems, Dec. 7-9, 2012, pp. 41-54, doi:10.1109/ICIES.2012.6530842.

Teperik et al., "Omnidirectional absorption in nanostructured metal surfaces", Nature Photonics, Apr. 27, 2008, vol. 2, pp. 299-301, doi: 10.1038/nphoton.2008.76.

Timoshenko, "Vibration problems in engineering", John Wiley & Sons, 1990, Second Edition—Fifth Printing, 497 pgs. (Presented in two parts).

Vantomme et al., "Self-sustained actuation from heat dissipation in liquid crystal polymer networks", Journal of Polymer Science Part A: Polymer Chemistry, Apr. 27, 2018, vol. 56, No. 13, pp. 1331-1336, 10.1002/pola.29032.

Vernerey et al., "The mechanics of hydrogel crawlers in confined environment", Journal of the Royal Society Interface, Jul. 26, 2017, vol. 14, No. 20170242, pp. 1-11, doi: 10.1098/rsif.2017.0242.

Wang et al., "In-built thermo-mechanical cooperative feedback mechanism for self-propelled multimodal locomotion and electricity generation", Nature Communications, Aug. 24, 2018, vol. 9, No. 1, 3438, pp. 1-11, doi: 10.1038/s41467-018-06011-9.

Wang et al., "Light controlled graphene-elastin composite hydrogel actuators", Nano Letters, Jun. 12, 2013, vol. 13, No. 6, pp. 2826-2830, doi:10.1021/nl401088b.

Wang et al., "Self-Floating Carbon Nanotube Membrane on Macroporous Silica Substrate for Highly Efficient Solar-Driven

(56) References Cited

OTHER PUBLICATIONS

Interfacial Water Evaporation", ACS Sustainable Chemistry & Engineering, Jan. 22, 2016, vol. 4, No. 3, 11 pgs., doi: 10.1021/acssuschemeng.5b01274.

Wani et al., "A light-driven artificial flytrap", Nature Communications, May 23, 2107, vol. 8, No. 15546, pp. 1-7, doi: 10.1038/ncomms15546.

White et al., "A high frequency photodriven polymer oscillator", Soft Matter, Jul. 23, 2008, vol. 4, No. 9, pp. 1796-1798, doi: 10.1039/B805434G.

White et al., "Programmable and adaptive mechanics with liquid crystal polymer networks and elastomers", Nature Materials, Oct. 22, 2015, vol. 14, pp. 1087-1098, doi: 10.1038/nmat4433.

Williams et al., "A self-propelled biohybrid swimmer at low Reynolds number", Nature Communications, Jan. 17, 2014, vol. 5, No. 3081, pp. 1-8, doi: 10.1038/ncomms4081.

Yao et al., "Electrically Tunable Metasurface Perfect Absorbers for Ultrathin Mid-Infrared Optical Modulators", Nano Letters, Oct. 13, 2014, vol. 14, No. 11, 7 pgs., doi: 10.1021/nl503104n.

Yeghiazarian et al., "Directed Motion and Cargo Transport Through Propagation of Polymer-Gel Volume Phase Transitions", Advanced Materials, May 25, 2005, vol. 17, No. 15, pp. 1869-1873, doi: 10.1002/adma.200401205.

Yoshida, "Self-Oscillating Gels Driven by the Belousov-Zhabotinsky Reaction as Novel Smart Materials", Advanced Materials, Aug. 4, 2010, vol. 22, No. 31, pp. 3463-3483, doi: 10.1002/adma.200904075.

Yoshida et al., "Evolution of self-oscillating polymer gels as autonomous polymer systems", NPG Asia Materials, Jun. 20, 2014, vol. 6, No. 6, 14 pgs., doi: 10.1038/am.2014.32.

Zhao et al., "Azobenzene-based light-responsive hydrogel system", Langmuir, Mar. 13, 2009, vol. 25, No. 15, pp. 8442-8446, doi:10.1021/la804316u.

Zhou et al., "3D self-assembly of aluminum nanoparticles for plasmon-enhanced solar desalination", Nature Photonics, Apr. 25, 2016, vol. 10, pp. 393-398, doi: 10.1038/nphoton.2016.75.

Zhou et al., "Self-assembled spectrum selective plasmonic absorbers with tunable bandwidth for solar energy conversion", Nano Energy, Feb. 2017, vol. 32, pp. 195-200, doi: 10.1016/j.nanoen.2016.12.031.

\* cited by examiner

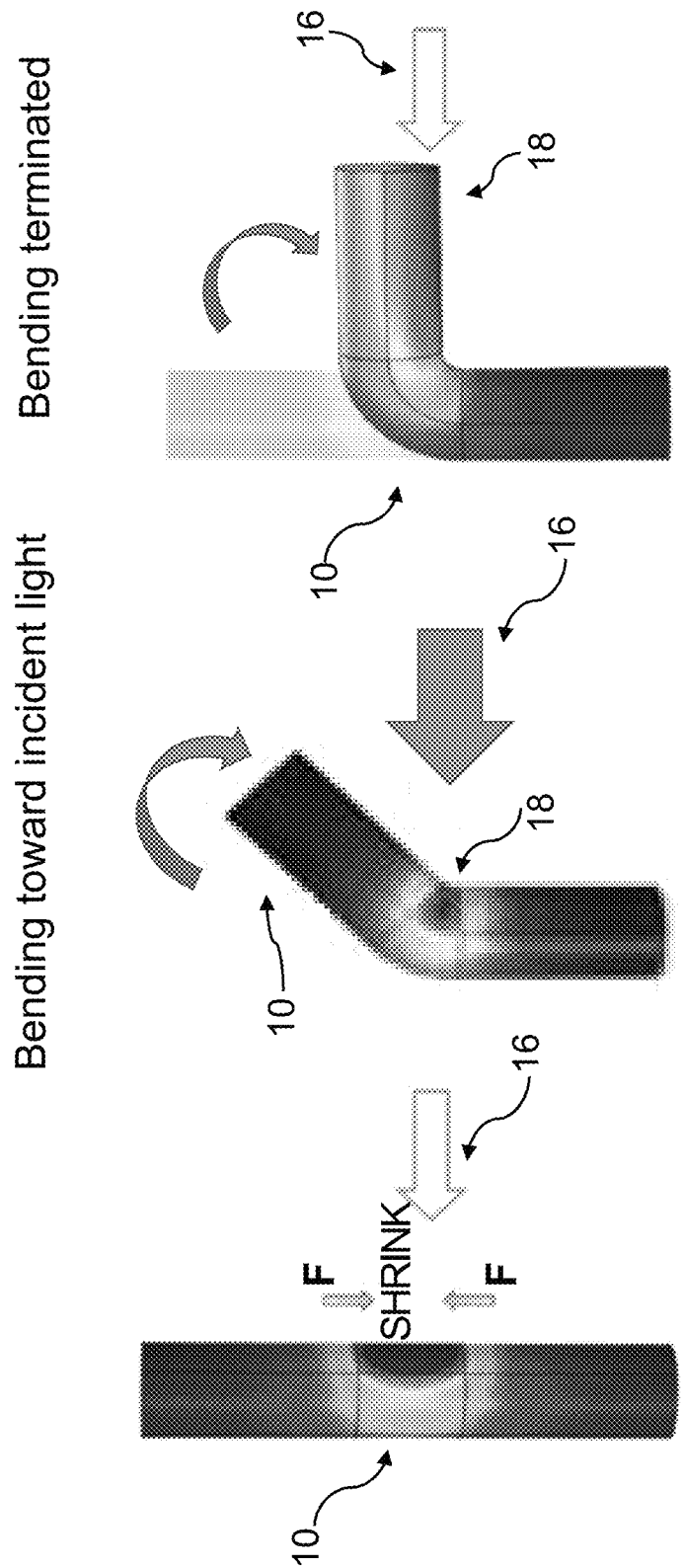

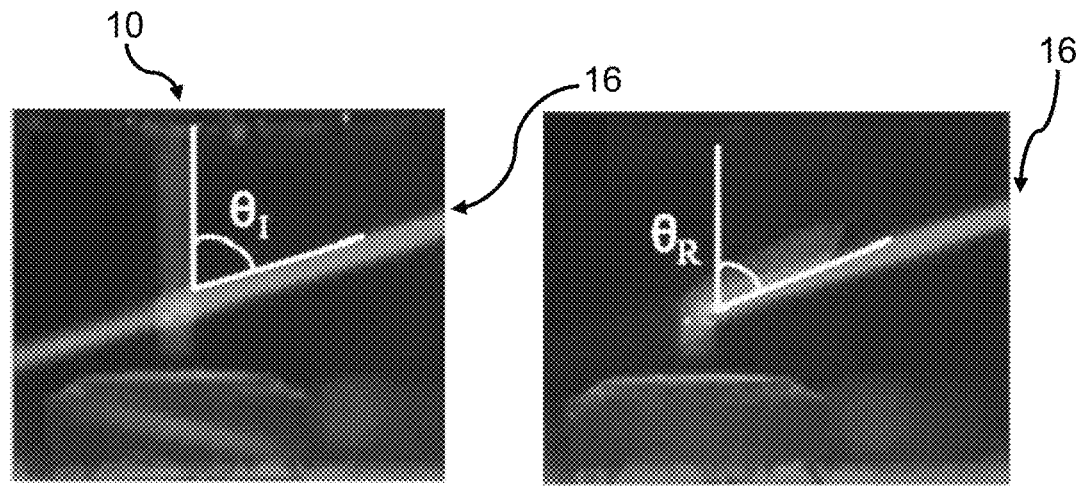
FIG. 13A   FIG. 13B
FIG. 14
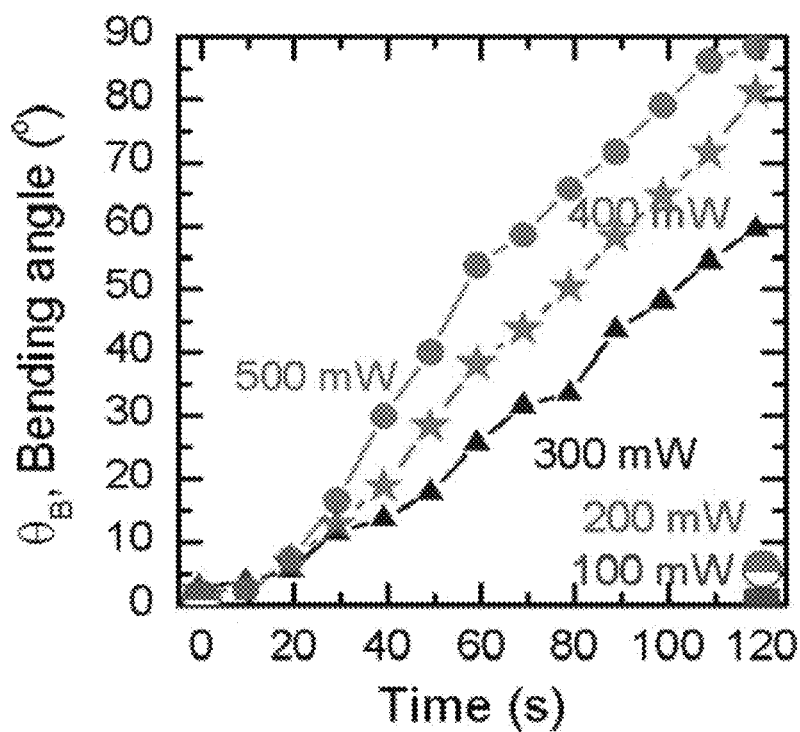

FIG. 18A    Thermal Diffusion Dominated
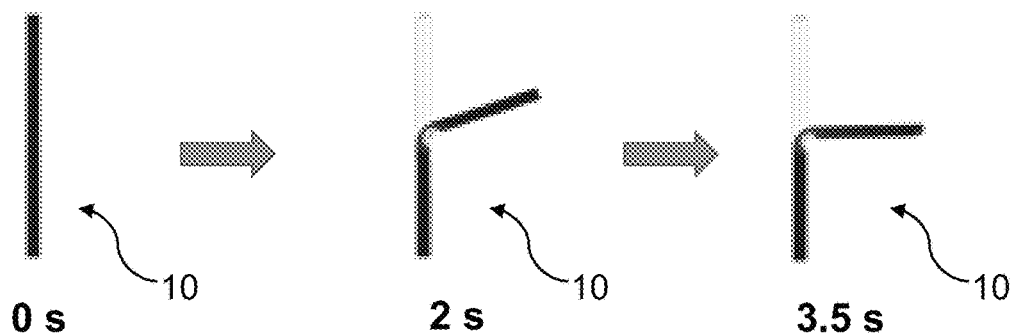
FIG. 18B    Mass Diffusion Dominated
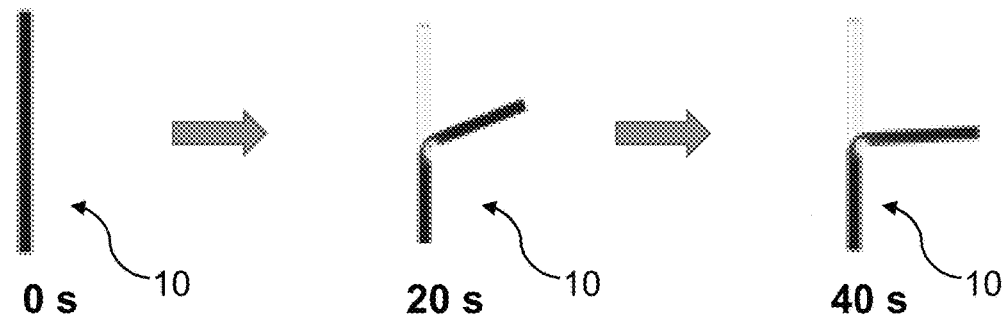
FIG. 18C
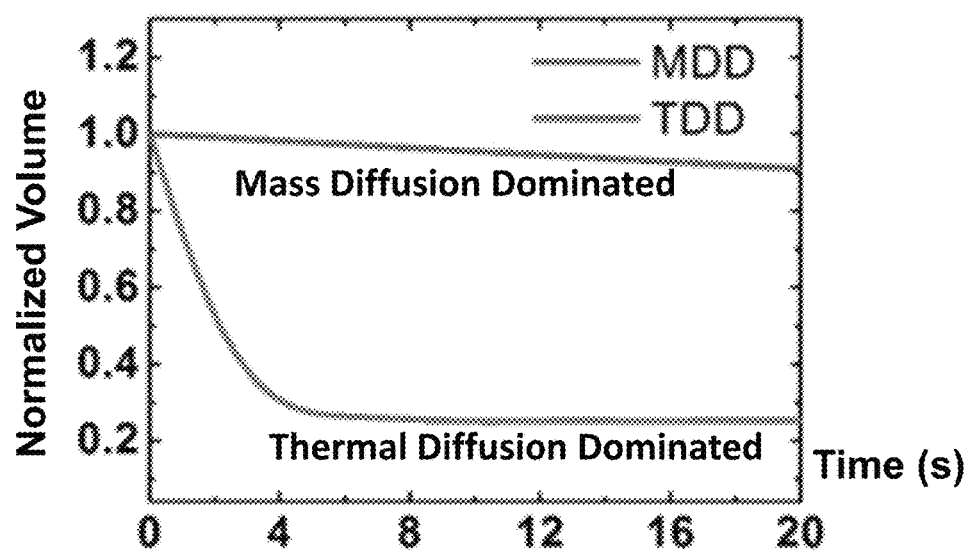

Azimuthal Angles (0-360°)

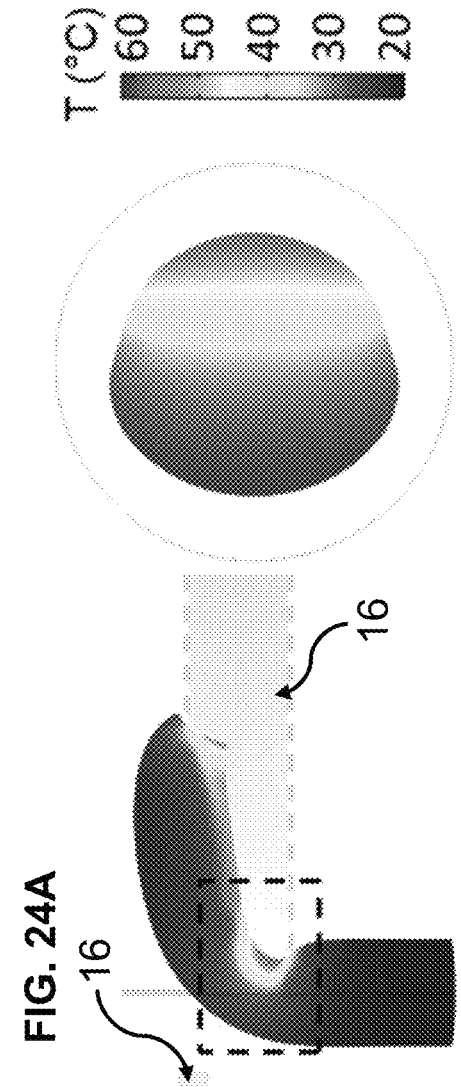
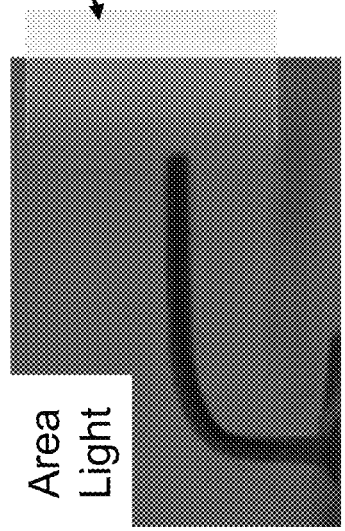
FIG. 23A Spot Light
FIG. 23B Area Light
FIG. 24A
FIG. 24B
FIG. 25A Horizontal Cross Section
FIG. 25B

FIG. 26A
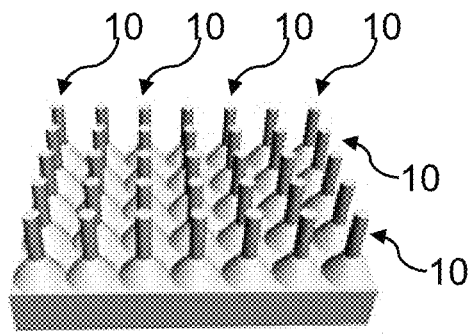
FIG. 26B Control Sample (No elongated bodies)
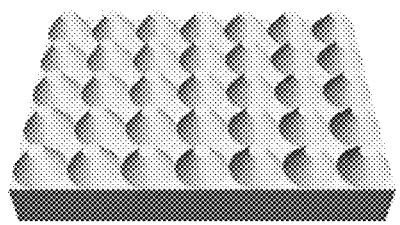
FIG. 26C
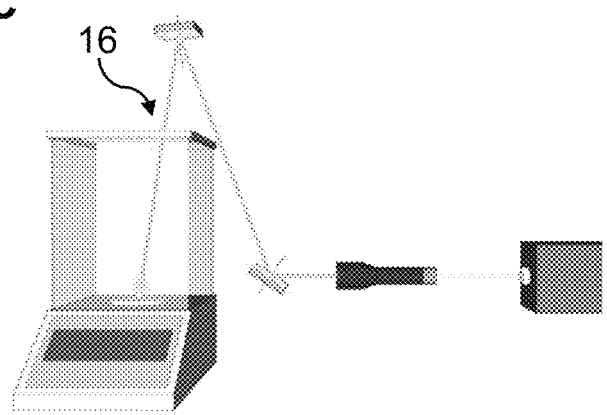

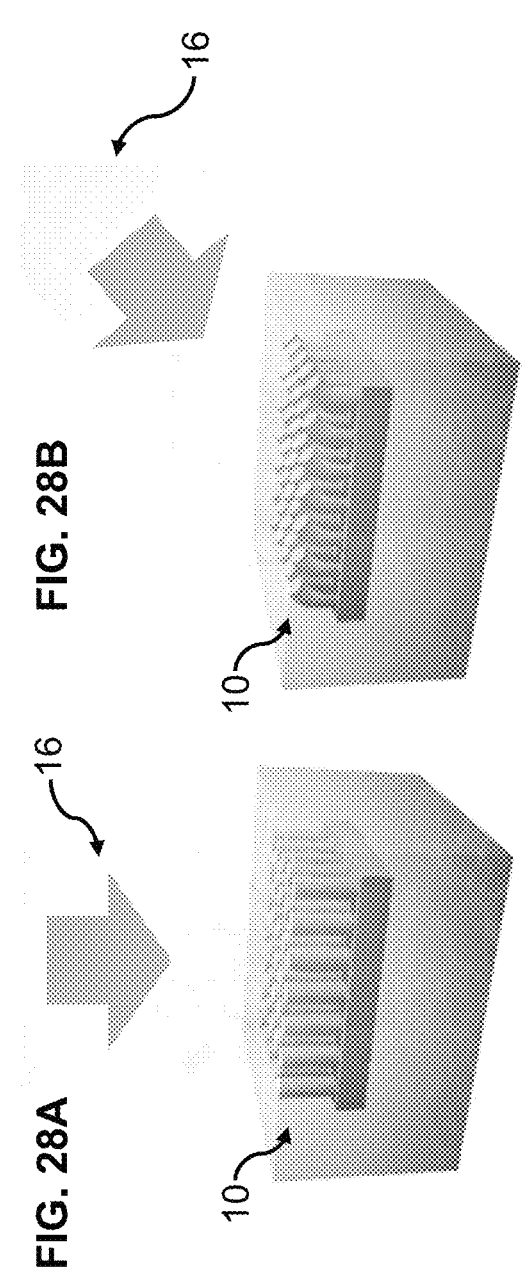
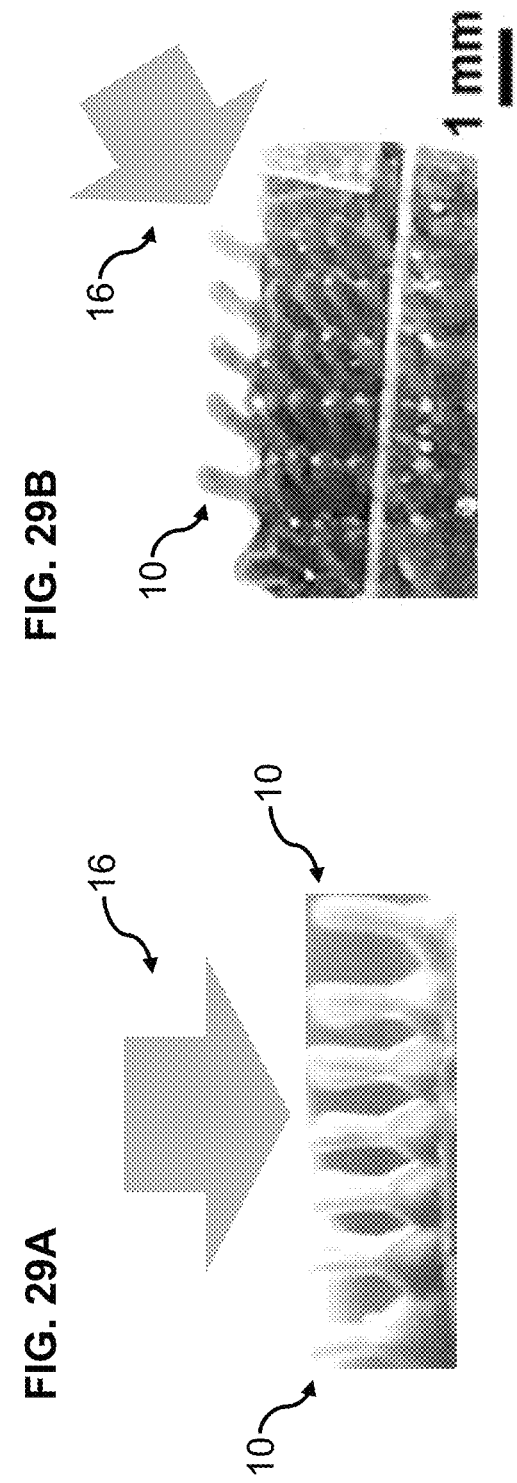

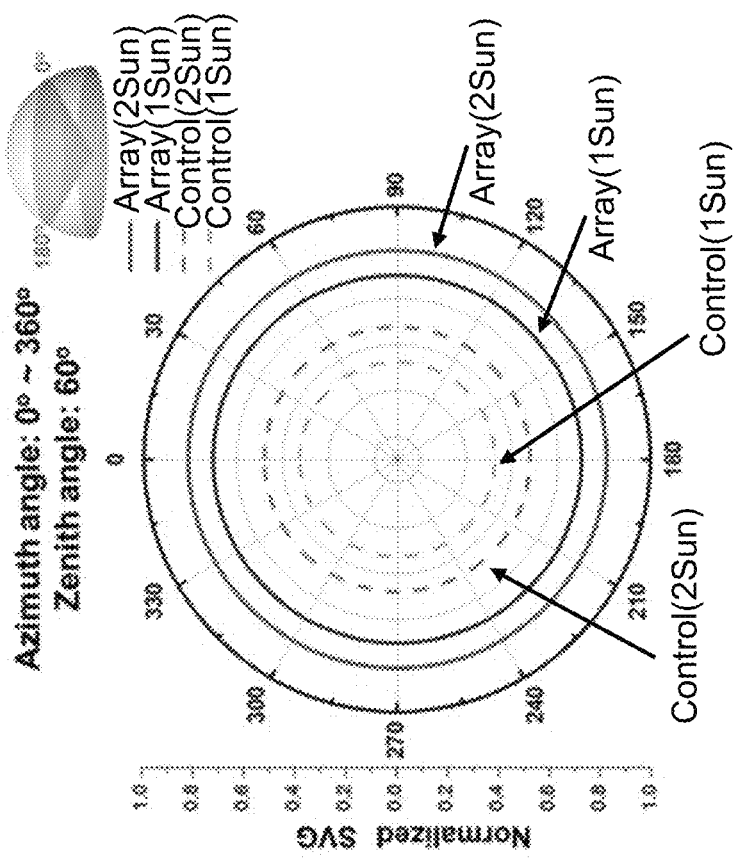
FIG. 32C
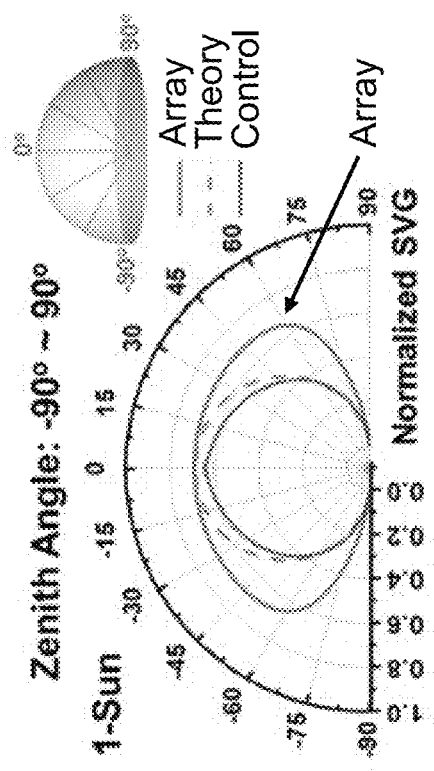
FIG. 32A
FIG. 32B

DETECT

SIGNAL ABSORPTION

ARTIFICIAL SUNFLOWERS
(Track and Harvest Solar Energy)

MATERIALS FOR AUTONOMOUS TRACKING, GUIDING, MODULATING, AND HARVESTING OF ENERGETIC EMISSIONS

CROSS REFERENCE TO RELATED APPLICATIONS

This application is a national stage of PCT Patent Application No. PCT/US2018/027148, entitled "Materials for Autonomous Tracking, Guiding, Modulating, and Harvesting of Energetic Emissions" to He et al., filed Apr. 11, 2018, which claims priority to U.S. Provisional Application No. 62/484,269, entitled "Materials for Autonomous Tracking, Guiding, Modulating and Harvesting of Energetic Emissions" to He et al., filed Apr. 11, 2017, the disclosures of which are incorporated by reference herein in their entirety.

FIELD OF THE INVENTION

The present invention relates generally to materials, and more specifically to tropistic materials, their methods of manufacture and applications thereof.

BACKGROUND OF THE INVENTION

The capability to efficiently and simultaneously detect, track, and harvest or modulate signals (e.g., optical, electromagnetic, and acoustic) is vital for a broad range of optics, photonics, optoelectronics, energy-related technologies, and also national-security technologies. The current state of the art relies on tuning the physical properties of materials or employing electronics and computer programmed mechanical systems, which lack the ability to adaptively interact and engage with the signals. For example, tuning the refractive index of the coating layer of a photo-detecting panel to reduce the photon loss at the surface suffers from limited tenability and lacks the capability of directing the optical beam. Waveguides can direct signals but are normally cm-scale and made of rigid and heavy metallic materials. Other systems that can both detect and follow signals typically use a MEMS-based approach or pre-programmed electronics to mechanically lift and tilt a heavy photo-detecting panel or to fold an electromagnetic-receiving antenna towards the incident signals. While these systems attempt to combine the discrete processes of sensing and actuation, the capability comes with high fabrication and operation costs.

Further, enhancing the power density of incident energy is critical for most systems that require energy input maximization, such as emissive energy harvesting or remote signal sensing. A common problem for such systems is that light and many other electromagnetic waves often project on planar surfaces obliquely, causing a drop in input energy per area (power density) and significant energy loss.

SUMMARY OF THE INVENTION

The present disclosure provides in accordance with the current invention embodiments directed to adaptively configurable tropistic materials for real-time detection, tracking, modulation, and harvesting of incident energetic emissions.

In some embodiments, the invention is directed to a composite tropistic material comprising:
at least one responsively deformable polymeric material having at least one absorber material dispersed therein;
wherein the absorber material is configured to transform an incident energetic impulse into the specific energetic stimulus; and
wherein the deformable polymeric material undergoes a local expansion or contraction when subjected to a specific energetic stimulus.

In other embodiments, the incident energetic impulse is selected from the group of thermal energy, electromagnetic waves, acoustics waves, or magnetic fields.

In some other embodiments, the incident energetic impulse is photonic emission, and the material is phototropic.

In still other embodiments, the deformable polymeric material is selected from the group of poly(N-isopropylacrylamide) (PNIPAAm), poly(acrylic acid-co-acrylamide), poly(2-dimethylaminoethyl methacrylate) (PDMAEMA), liquid crystalline elastomer (LCE), or azobenzene/spiropyran-based polymer.

In yet other embodiments, the absorber material is selected from the group of gold nanoparticles, carbon-based material, metallic nanoparticles, or magnetic nanoparticles.

In still yet other embodiments, the invention is directed to a tropistic device comprising:
at least one elongated body comprised of at least one responsively deformable polymeric material having at least one absorber material dispersed therein;
wherein the deformable polymeric material undergoes a local expansion or contraction when subjected to a specific energetic stimulus, said expansion or contraction causing a deformation of the elongated body; and
wherein the absorber material is configured to transform an incident energetic impulse into the specific energetic stimulus.

In some such embodiments, the incident energetic impulse is selected from the group of thermal energy, electromagnetic waves, acoustics waves, or magnetic fields.

In some such embodiments, the incident energetic impulse is photonic emission, and the device is phototropic.

In other such embodiments, the deformable polymeric material is selected from the group of poly(N-isopropylacrylamide) (PNIPAAm), poly(acrylic acid-co-acrylamide), poly(2-dimethylaminoethyl methacrylate) (PDMAEMA), liquid crystalline elastomer (LCE), or azobenzene/spiropyran-based polymer.

In still other such embodiments, the absorber material is selected from the group of gold nanoparticles, carbon-based material, metallic nanoparticles, or magnetic nanoparticles.

In yet other such embodiments, the deformable polymeric material is poly(N-isopropylacrylamide) (PNIPAAm), and the absorber material is one of either gold nanoparticles or reduced graphene oxide.

In still yet other such embodiments, the deformable polymeric material is electrically conductive graphite-containing ionogel, and the absorber material is ferroelectric nanocomponents.

In some embodiments, the elongated body has one of either a pillar or cylindrical shape.

In other embodiments, the device has an equilibrium state, where the incident energetic impulse stops causing deformation of the elongated body.

In still other embodiments, the incident energetic impulse causes deformation of the elongated body at an incident zenith angle range of 0° to 150°.

In yet other embodiments, the incident energetic impulse causes a 90° deformation of the elongated body in less than 3.5 seconds.

In still yet other embodiments, the deformable polymeric material has pore sizes of 10 microns or less.

In some such embodiments, the elongated body has a height of 1 cm or less.

In other such embodiments, the elongated body has a height of 1.5 mm or less.

In still other such embodiments, a plurality of the elongated bodies are arranged in an array.

In yet other such embodiments, the device is a detector and wherein the elongated body has first and second ends; and
wherein the deformation is such that the position of at least one of the first and second ends is altered such that the incident energetic impulse is incident thereon.

In still yet other such embodiments, the device is a thermal absorber and wherein the elongated body has first and second ends; and
wherein the specific energetic stimulus is thermal energy.

In some embodiments, the device is a waveguide and wherein the elongated body has first and second ends, and a cladding layer disposed on an outer surface thereof; and
wherein the cladding layer has a refractive index configured to guide the incident energetic impulse through along the elongated body.

In other embodiments, the device is an optical diode and wherein the elongated body has first and second ends, and a cladding layer disposed on an outer surface thereof, and wherein the device further comprises:
a first light source disposed in relation to the first end such that an energetic emission from the first light source is incident upon the first end;
a second light source disposed in relation to the elongated body such that an energetic emission from the second light source is incident upon at least one portion of the elongated body;
wherein the absorber material is configured to transform an incident energetic impulse from the second light source into the specific energetic stimulus; and
wherein the cladding layer has a refractive index configured to guide the incident energetic impulse through along the elongated body.

In yet other embodiments, the device is immersed in a water bath.

In still other embodiments, the invention is directed to a tropistic material comprising at least one responsively deformable polymeric material, wherein the deformable polymeric material undergoes a local expansion or contraction directly in response to incident stimulus.

In yet other embodiments, the deformable polymeric material is selected from the group of polydimethylsiloxane (PDMS), poly(methyl methacrylate) (PMMA), hydrogel, or liquid crystalline elastomer (LCE).

In some other embodiments, the incident stimulus is photonic emission, and the material is phototropic.

In still yet other embodiments, the incident stimulus is one of either UV light or visible light.

In some such embodiments, the deformable polymeric material further comprises at least one fluorophore material dispersed within the deformable polymeric material.

In other such embodiments, the fluorophore material is one of either spiropyran or azobenzene.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which form a part of this disclosure.

BRIEF DESCRIPTION OF THE DRAWINGS

These and other features and advantages of the materials will be better understood by reference to the following detailed description when considered in conjunction with the accompanying data and figures, which are presented as exemplary embodiments of the disclosure and should not be construed as a complete recitation of the scope of the invention, wherein:

FIGS. 4A-4C provide, in accordance with various exemplary embodiments of the invention, schematics of a AuNP-incorporated hydrogel pillar that deforms due to incident light, and also provide schematics illustrating the photothermal conversion and mechanics that cause the elongated body to bend toward the incident light in accordance with some exemplary embodiments of the invention.

FIG. 5A shows absorbance of a AuNP aqueous solution; FIG. 5B shows absorbance of a Au-PNIPAAm hydrogel; and FIG. 5C shows absorbance of a reduced graphene oxide (rGO)-PNIPAAm hydrogel in accordance with some such embodiments.

FIGS. 13A and 13B provide images showing the incident angle ($\theta_I$) and response angle ($\theta_R$) for a micropillar in accordance with embodiments of the invention.

FIG. 14 provides a graph showing the response rate of a bending micropillar (10) under illumination at varying intensities in accordance with some embodiments of the invention.

FIGS. 18A-18C provide schematics and a graph comparing the time-dependent tropistic locomotion and kinetic deswelling in tropistic devices with different dominating diffusion mechanisms in accordance with exemplary embodiments of the invention.

FIGS. 23A and 23B provide images of a pillar-shaped phototropic device in accordance with embodiments exposed to a narrower spot light (FIG. 23A) and a wider area light (FIG. 23B).

FIGS. 24A and 24B provide schematics of a pillar-shaped phototropic device in accordance with embodiments exposed to a narrower spot light (FIG. 24A) and a wider area light (FIG. 24B).

FIGS. 25A and 25B provide schematics of the horizontal cross section of a pillar-shaped phototropic device in accordance with embodiments exposed to a narrower spot light (FIG. 25A) and a wider area light (FIG. 25B).

FIG. 26A provides a schematic of a tropistic device with an absorber array in accordance with some embodiments of the invention.

FIG. 26B provides a schematic of a control sample, which has a textured surface but, unlike the device shown in FIG. 26A, does not contain elongated bodies.

FIG. 26C provides a schematic of an experimental setup for studying angular-invariance of solar vapor generation for tropistic material devices formed in accordance with some embodiments.

FIGS. 28A and 28B provide schematics of an array of cylindrical elongated bodies, in accordance with exemplary embodiments, designed to track light incidence and maintain their tip surface normal to the incident direction, maximizing input power density.

FIGS. 29A and 29B provide schematics of a detailed view of an array of cylindrical elongated bodies, in accordance with exemplary embodiments, and their bending motion resulting from light incidence.

FIGS. 32A and 32B provide graphs showing the measured SVG efficiency of phototropic devices with an array of elongated bodies under different zenith angles for a theoretical power density of 1 Sun (FIG. 32A) and 2-Sun illumination (FIG. 32B), for some exemplary embodiments of the invention.

FIG. 32C provides a graph showing the SVG of a phototropic material device in accordance with some other exemplary embodiments of the invention with a rGO-incorporated array at a zenith angle of 60° and all azimuthal angles for both 1-Sun and 2-Sun systems.

DETAILED DESCRIPTION OF THE INVENTION

Figure 1:
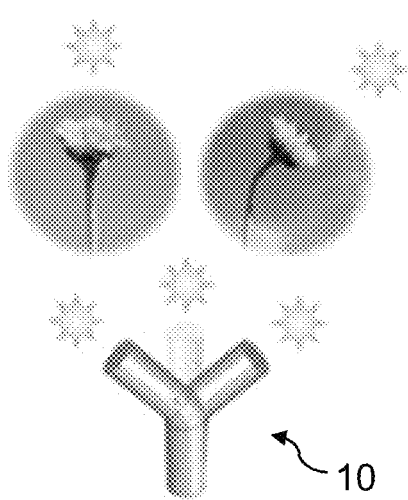
FIG. 1 provides schematics of heliotropism of sunflowers and tropism in sunflower-like biomimetic omnidirectional trackers according to some exemplary embodiments of the invention.

The embodiments of the invention described herein are not intended to be exhaustive or to limit the invention to precise forms disclosed. Rather, the embodiments selected for description have been chosen to enable one skilled in the art to practice the invention.

Turning now to the drawings, tropistic materials incorporating a class of adaptively configurable materials for real-time detection, tracking, and processing incident stimulus are provided. In embodiments, incident stimulus can comprise any energetic emission or signals, such as, for example, electromagnetic waves (UV, visible, IR, microwaves, milli-waves, etc.), acoustics waves, or magnetic fields. In some other embodiments, incident stimulus includes temperature, pH, light, or exposure to chemicals. In various embodiments, the materials comprise a deformable stimuli-responsive material (e.g., pristine and/or composite), which can adapt configuratively or physically to a stimulus, and a plurality of absorbers configured to convert external incident stimuli to a type of stimulus the responsively deformable material is reactive toward.

Micron-scale tropistic materials in accordance with embodiments of the invention may be configured to allow for, among other things: (1) fully autonomous operation and high energy efficiency with systems that do not rely on programming or electricity, but rather, directly utilize incident stimulus or light as a power source while constantly tracking and harvesting the stimulus or light; (2) μm-mm level, integratable, easy and low-cost fabrication; (3) fast response, which may, for example, have a time scale of 0.5 to 60 seconds; and (4) high-accuracy, real-time tracking, harvesting, and directing of external signals such as optical beams. Some exemplary embodiments present a novel soft omnidirectional tracker with a remarkably high tracking accuracy of >99.8% and a fast response at $10^{-2}$-10 second scale. Accordingly, embodiments of the invention involve adaptively configurable materials configured to automatically detect, track, and harvest or respond to an energetic emission. In many exemplary embodiments, the incident stimulus is photonic energetic emission, and the adaptively reconfigurable material is phototropic. Using such materials, these embodiments may be used for a variety of applications including, for example, the harvesting of photons, and amplification of signals for space telescopes or medical microscope imaging, electromagnetic systems, optics or photonics and radar, and facilitating or directly serving as antenna, waveguides, and modulators.

Many embodiments of the invention provide new solutions and advantages for conventional electronics for signal detection, regulation, and harvesting via the autonomously continuous detection-diagnosis-response mechanism. Some such embodiments provide deformable and micron-scale size, enabling integration with micro-optoelectronics or micro-optical devices as a thin-film surface coating for example, which is currently impossible for conventional silicon- or other inorganic semiconducting material-based electronic systems or devices, such as MEMS, electrical sensors and controllers. Some other embodiments provide systems that are scalable to mm or cm sizes and function as well as micron-scale systems. The solution-based fabrication of such deformable material systems not only allows for thin-film coating, but can also be used to construct arbitrary geometric shapes and sizes.

Other such embodiments of the invention provide accurate tracking and fast response. The response accuracy and rate of systems according to such embodiments can be well controlled at <1 degree and tuned at will by adjusting key influencing parameters in the material systems. In some such embodiments, the material compositions, such as the soft material body or absorbers, and/or the design, such as shape and dimension, may be varied. Still other embodiments further provide for self-adaptive and fully autonomous materials. Compared to active systems that must be powered by electricity (MEMS) and controlled by computer programs, exemplary embodiments of the present invention provide a passive system that does not require other external energy or additional controllers. Instead, with such embodiments, the system is uniquely directly powered and controlled by the signal that the system responds to, functioning fully autonomously.

Embodiments of Tropistic Material Systems

Many embodiments of the invention are directed to tropistic systems comprising a composite material system that incorporates a reversibly photo-responsive polymer, which can be a fluorophore-incorporated polymer such as fluorophore-incorporated liquid crystal elastomer (LCE) and can also be a photo-thermo-mechanically responsive polymer that couples photo-thermal and thermal-mechanical conversions into a single material system. In various such embodiments, the system comprises materials capable of both photo-thermal and thermal-mechanical conversions. In still other embodiments, such photo-thermo-mechanical responsive systems are two-component systems comprising a deformable material that is responsive to a specific physical stimulus (such as an energetic emission), and an absorber capable of producing or enhancing the physical stimulus from an external energetic emission.

Turning to the selection of the responsively deformable material, in various embodiments of the invention, such materials may comprise any suitable polymeric material (e.g., gels, elastomers, etc.) capable of exhibiting large deformation in response to an environmental stimuli, such as, for example, temperature, pH, light, magnetic signals, or chemical exposure. One exemplary responsively deformable material according to embodiments may comprise, for example, poly(N-isopropylacrylamide) (PNIPAAm), a thermally or temperature-responsive hydrogel, that undergoes volume phase changes and generates large deformation (up to 8 times). Specifically, it shrinks when its temperature is higher than its lower critical solution temperature (LCST) and swells at a temperature that is less than the LCST. In various embodiments, the LCST for such hydrogels is around 32° C. In still other embodiments, the deformable materials comprise poly(acrylic acid-co-acrylamide) and/or poly(2-dimethylaminoethyl methacrylate) (PDMAEMA), which are pH-responsive hydrogels that can shrinks at pH<4.3 and pH>7.7, respectively.

For systems incorporating responsively deformable materials where the incident stimulus desired to be harvested, detected, etc. does not correspond with the specific stimulus to which the deformable material responds, a supplemental absorber can be introduced to bridge the external stimuli to the responsively deformable material in other embodiments of the invention. In such embodiments, the absorber is rationally selected according to the nature of the specific incident energy that is required to be collected. By carefully selecting the absorbers and facially tuning their behavior to a selected responsively deformable material system, it would be possible to configure the tropistic system in accordance with embodiments to respond to a wide range of incoming stimuli and generate significant response accordingly. For example, in some exemplary embodiments, gold nanoparticles are incorporated into a PNIPAAm hydrogel, which is a thermal responsive soft material as discussed above, to absorb incoming photonic energy and convert it to thermal energy. In such embodiments, the gold nanoparticles operate to heat the hydrogel above its LCST via a physical phenomenon called plasmon resonance. In some such exemplary embodiments, most gold nanoparticles have a particle size of about 50 nm to 100 nm. In another exemplary embodiment, carbon-based materials, such as carbon black, carbon nanotubes, graphene, graphene oxides, etc. are used to provide different photonic absorption characteristics ranging from visible light to near-IR. In still other embodiments, metallic nanoparticles with unique dimension and/or geometry are used to exhibit different absorption features. In additional embodiments, by employing magnetic nanoparticles into the responsively deformable material systems, the material system is sensitized to respond to magnetic fields.

It should be noted that, although specific responsively deformable material systems have been disclosed that work in conjunction with absorbers, deformable materials systems capable of working intrinsically (for instance, without absorbers) are provided in other embodiments of the invention. In many such embodiments, a provided external stimulus corresponds with the specific stimulus requirements of the responsively deformable material system. For example, although the exemplary responsively deformable materials, described above, provide embodiments of systems incorporating temperature- or pH-responsive hydrogels that require incorporation with absorbers that absorb and convert external photo-signals into thermal energy or pH change (acid or base) to become photo-thermal/pH-responsive materials, it should be understood that intrinsic photo-responsive deformable materials may also be used. In such embodiments, the responsively deformable materials deform directly in response to incident photo emissions such as UV and visible light. Some exemplary intrinsic photo-responsive deformable materials include elastic polymers (e.g., hydrogels, PMMA, PDMS, etc.) containing fluorophores, which can be small molecules or groups that change molecular configuration upon illumination of visible or UV light. Fluorophores in many such embodiments include spiropyran and azobenzene. Other exemplary embodiments include liquid crystalline elastomers (LCEs) that experience phase changes and deform when a corresponding photo stimulus shines on it.

Finally, although the above discussion has focused on the material system components necessary to achieve energetic emission detecting and tracking, in other various embodiments of the invention, additional functionalities, such as absorption, guiding and further modification of signals, can be delivered by carefully designing the geometry of the material system and employing additional functional materials in the system. For example, in some such embodiments, a core-clad structure is employed in the material system to provide the ability to guide and further modify the incident signal being tracked. In other such embodiments, the core is transparent to incident light to efficiently guide it after absorption. In still other embodiments, tunable optic media, such as liquid crystals, is used to further manipulate the guided light signals. In such embodiments, the cladding may be designed to absorb the incident photonic energy and thus provide bending/tracking functionality. Using and combining such cladding structures and other materials in accordance with such embodiments provides self-adaptive, stimuli-responsive, deformable material systems that are controllable in terms of bending angle, response rate (bending and recovering speed), tracking accuracy, and guiding/modulation capabilities.

Although many of the above examples have described material systems responsive to photonic signals, it should be understood that the system can be customized and expanded for broad types of signals. For example, in accordance with still other such embodiments of the invention, ferroelectric nanocomponents are incorporated in electrically conductive graphite-containing ionogels to make magnetic-electro-mechanically responsive materials and achieve electromagnetic-tropism for the rapid, high-precision detection and engagement of electromagnetic or RF signals. Similarly, acoustic-tropism is realized with acoustic-electro-mechanical responsive materials in other embodiments of the invention, which incorporate piezoelectric PVDF nanofibers in electrically conductive polymer such as ionogels. Many other such responsive systems may be implemented in accordance with embodiments of the invention, as will be clear to one skilled in the art.

Embodiments of Tropistic Devices

Figure 2:
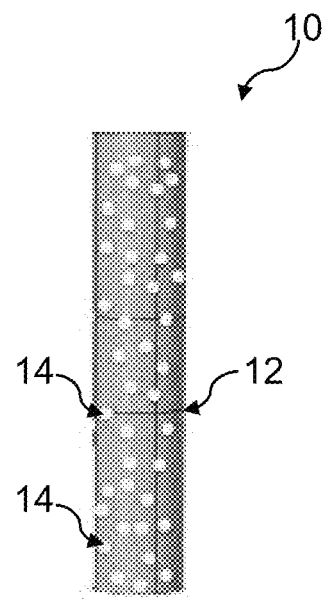
FIG. 2 provides a schematic of a gold nanoparticle (AuNP)-incorporated poly(N-isopropylacrylamide) (PNIPAAm) hydrogel pillar formed in accordance with many exemplary embodiments of the invention.
Figure 3:
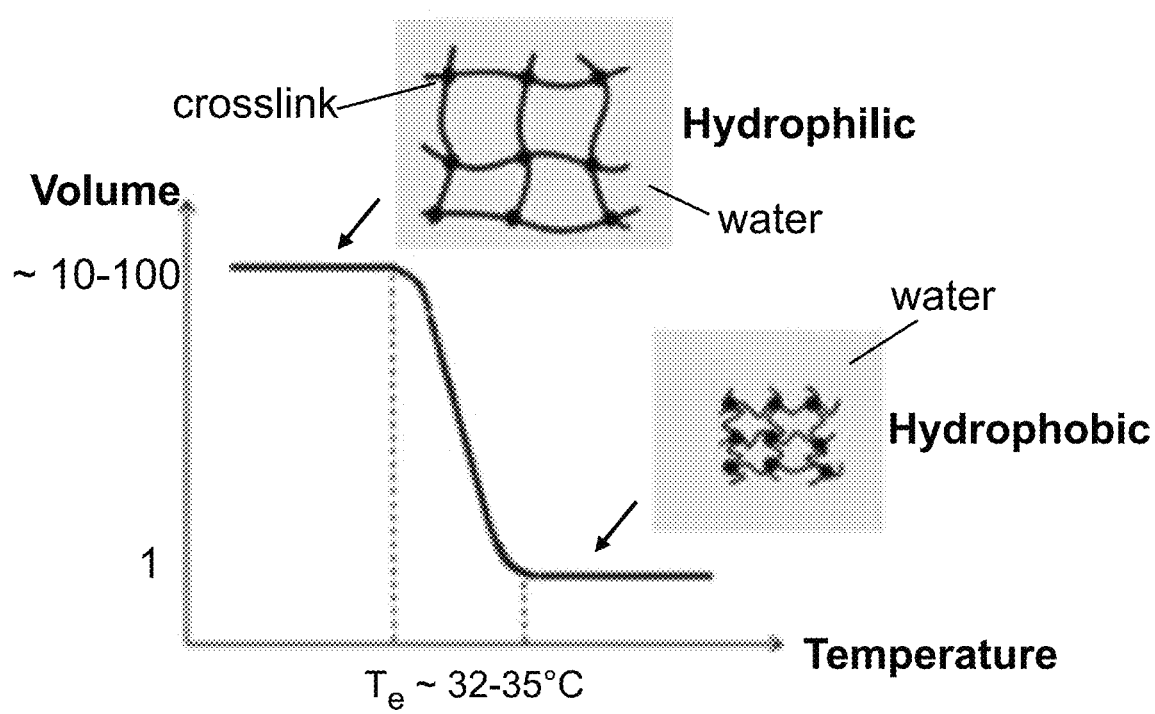
FIG. 3 provides a graph showing how the miscibility of PNIPAAm changes with temperature.

Various other embodiments of the invention are directed to devices that incorporate the tropistic material systems. Many exemplary embodiments are sunflower-like biomimetic omnidirectional trackers, as shown in FIG. 1. In some such embodiments, biological phototropism found in nature is successfully engineered into adaptively reconfigurable systems and devices that autonomously and precisely detect and track incident light in arbitrary and constantly varying directions covering the entire surrounding three-dimensional spherical space at room temperature, without auxiliary power supply or human intervention. As shown in FIG. 2, many such embodiments of the invention incorporate tropistic systems into an elongated body (10). In some such exemplary embodiments, the elongated body (10) has a pillar or cylindrical shape. In other such exemplary embodiments, the deformable polymeric material (12) has pore sizes of 10 microns or less. According to some other embodiments, the elongated body (10) has a height of 1 cm or less, and in still other such embodiments, the elongated body (10) has a height of 1.5 mm or less. In various embodiments, the elongated body (10) is fabricated by using a 3D-printed master and PDMS molds. In many exemplary embodiments of the invention, the polymer (12) is a thermo-responsive hydrogel with temperature-dependent miscibility. FIG. 3 provides a graph showing how the volume of PNIPAAm, one such thermo-responsive polymer, changes depending on the temperature range. FIG. 3 shows how temperatures below 32° C. cause the hydrogel to be hydrophilic and swell in volume, while temperatures above 35° C. cause hydrophobic behavior. The general design of such a device in accordance with many embodiments operates as described below.

For example, as shown in FIGS. 2 and 4A-4C, a gold nanoparticle (AuNP) (14)-incorporated PNIPAAm hydrogel (12) pillar (10) formed in accordance with embodiments would reconfigure adaptively to the incident light (16) (incident energetic impulse), by going through a process whereby: (1) a local temperature lift at the illumination site, where the incident emissive light (16) impinges on the pillar (10), and consequently a temperature gradient forms along the path where the incident light (16) passes through the pillar (10) (FIG. 4A); (2) the temperature gradient causes the pillar (10) to shrink at the illumination site when its temperature reaches a level above its LCST (specific energetic stimulus) (18); (3) the shrinkage at the illumination site causes the pillar (10) to deform (or bend) toward the incident direction caused by the unbalanced (local) shrinking (FIGS. 4B-4C); and (4) when the pillar (10) has substantially deformed such that it directly points toward the incident light (16), it blocks the photonic energy that was previously heating the side wall of the pillar (10) terminating further local shrinkage and deformation of the pillar (10) (FIG. 4C). Removing the light source (16) allows the pillar to return to its original state (FIG. 4A) in exemplary embodiments.

By using such a process, phototropic devices in accordance with embodiments of the invention can accurately track incident light (16). FIG. 4A also provides schematics illustrating the photo-thermal conversion and mechanics causing the elongated body (10) to bend toward the incident light (16). Moreover, the bending rate and recovery rate can be further fine-tuned by the detailed design of material process in both: (1) the deformable material (12), mainly the stimuli-response ratio and rate (speed), the mechanical modulus, and the geometry which determines the flexural modulus (i.e., the bending potential upon certain applied force); and (2) the absorber (14), specifically the coefficients of energy absorption and conversion, (i.e., the amount, the distribution, and their interface with the soft material).

Figure 5A:
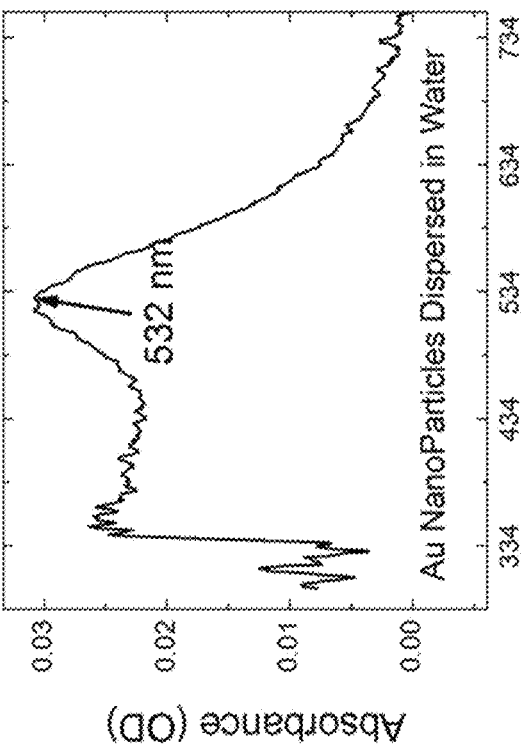
FIGS. 5A-5C provide UV-Vis absorption spectrum information for some exemplary embodiments of the invention, where.
Figure 5C:
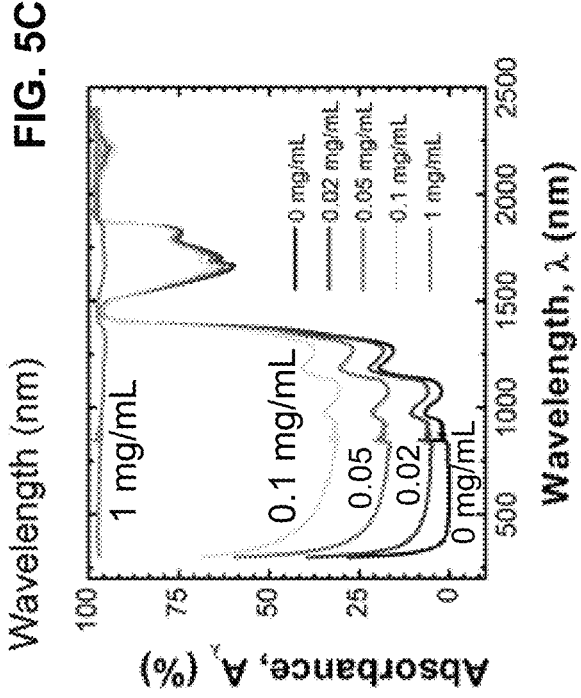
Figure 5B:
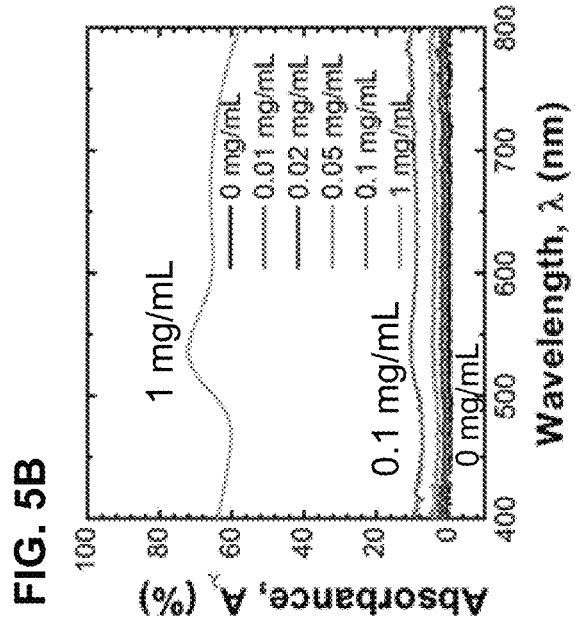
Figure 6:
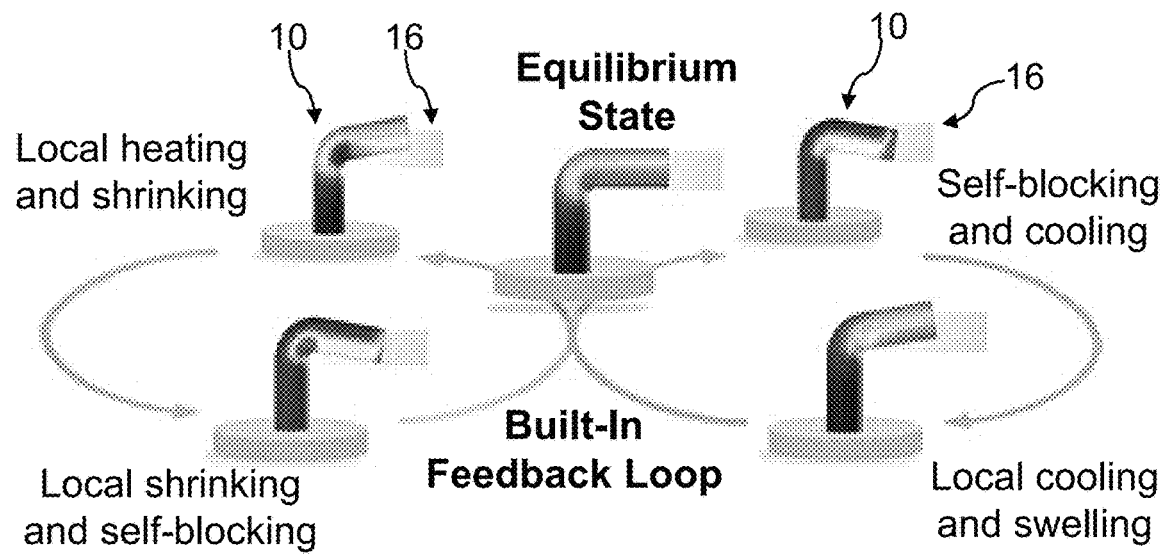
FIG. 6 provides a schematic of tropistic operation enabled by self-regulative actuation in accordance with exemplary embodiments of the invention.

In accordance with some other exemplary embodiments of the invention, PNIPAAm with gold nanoparticles, or reduced graphene oxide (rGO), homogeneously distributed in gel matrix have been tested for monochromatic (532 nm) and broadband (white light) absorption, respectively, for further analysis and characterization. For example, FIGS. 5A-5C provide UV-Vis absorption spectrum information for some such exemplary embodiments. For FIG. 5A, the absorption spectrum of AuNP for some embodiments was characterized by a UV-Vis spectrometer. For FIGS. 5B and 5C, the absorption spectrum of Au-PNIPAAm and rGO-PNIPAAm for some embodiments was characterized by a UV-Vis-NIR spectrometer. Mechanical properties of Au-PNIPAAm and rGO-PNIPAAm such as a stress-strain curve may be characterized using a dynamic mechanical analyzer. In many such embodiments, the tropistic material devices are immersed in a water bath. In various such embodiments of the invention, photo-absorbers (14) serve as photo-receptors and convertors, which sense the incoming photonic incidence (16) and convert photonic energy to thermal energy (18) via surface plasmon resonance (SPR), consequently inducing local heating and shrinking of the illuminated spot on the elongated body (10). As mentioned previously, according to exemplary embodiments of the current invention, the local shrinkage of hydrogel (12) and mechanical bending of the pillar (10) block the optical input (16), resulting in cooling of the blocked site; the hydrogel (12) then re-swells against the tendency to keep shrinking and repeats the cycle automatically (as shown in FIG. 6). In such embodiments, unique self-oscillating behaviors are modulated by the overshooting protection intrinsically built into the cyclical hydrogel-stimuli interactions.

More sophisticated than mere actuation, with many embodiments of the invention, tropism of the devices allow precise recognition of the direction of the emissive source and spontaneously terminate actuation at a point where the tip of the elongated body (10) is aligned with and pointing toward the incidence, leaving the tip surface normal to the emissive source, and balance is achieved (for example, as in FIG. 4C). As provided in FIG. 6, in such embodiments, this equilibrium state subtly balances thermal diffusion, mass diffusion, input energy (16), and mechanical forces generated by local deformation. Simple actuation, on the other hand, does not provide control over the bending or actuation, it tends to bend to arbitrary angles defined by incident power and mechanical limits, and the state of aiming (toward the incident energy (16)) with the elongated body (10) is unstable and may be off-balance following condition variations. In various such embodiments, the devices are phototropic and respond to photonic incidence, such as from a light source.

Figure 7A:
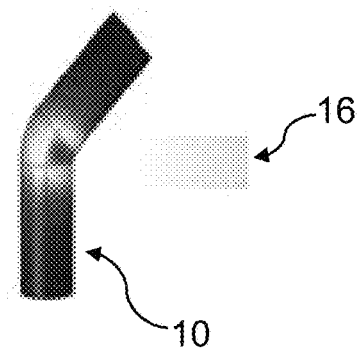
FIGS. 7A-7C provide schematics of tropistic operation where the input power under a 90° (zenith) illumination is insufficient (FIG. 7A), within the operation window (FIG. 7B), and too high (FIG. 7C) according to exemplary embodiments of the invention.
Figure 7B:
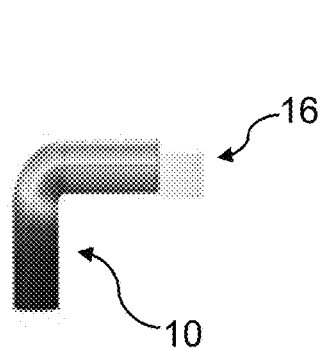
Figure 7C:
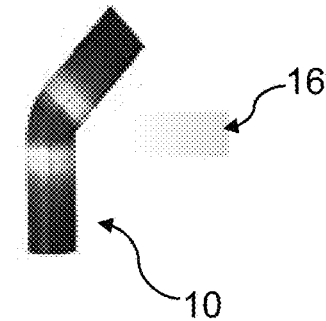
Figure 8A:
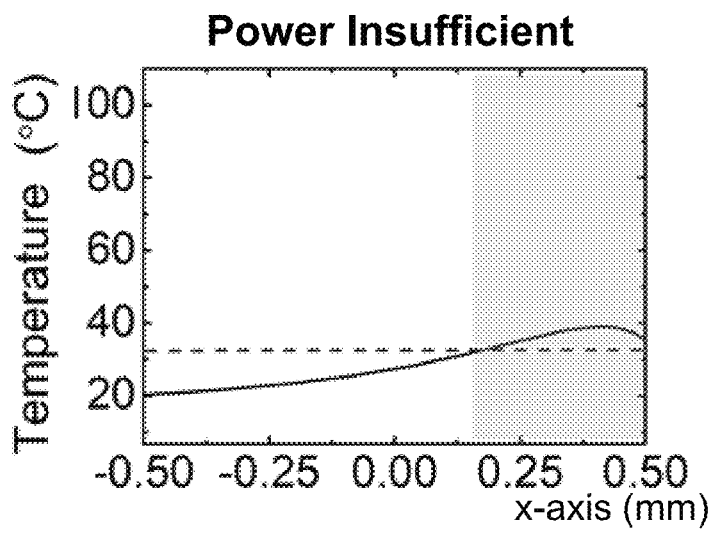
FIGS. 8A-8C provide data plots of temperature versus x-axis position graphs for: insufficient power (FIG. 8A), power within the operation window (FIG. 8B), and power overshoot (FIG. 8C) for exemplary embodiments of the invention.
Figure 8B:
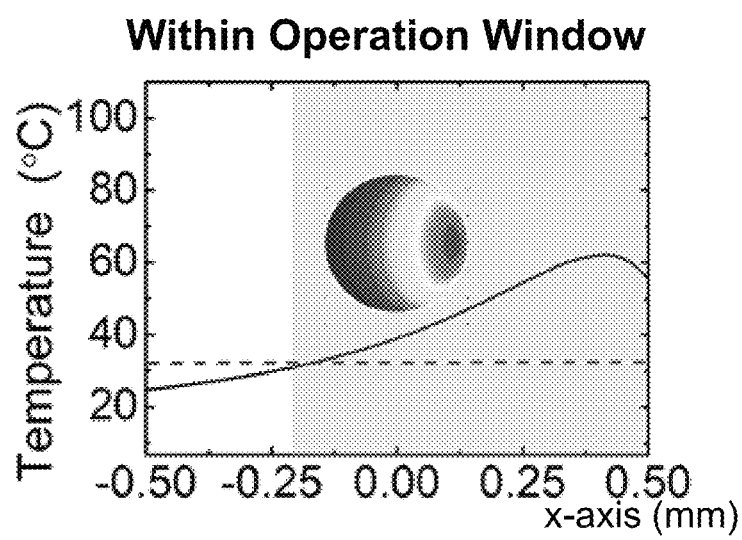
Figure 8C:
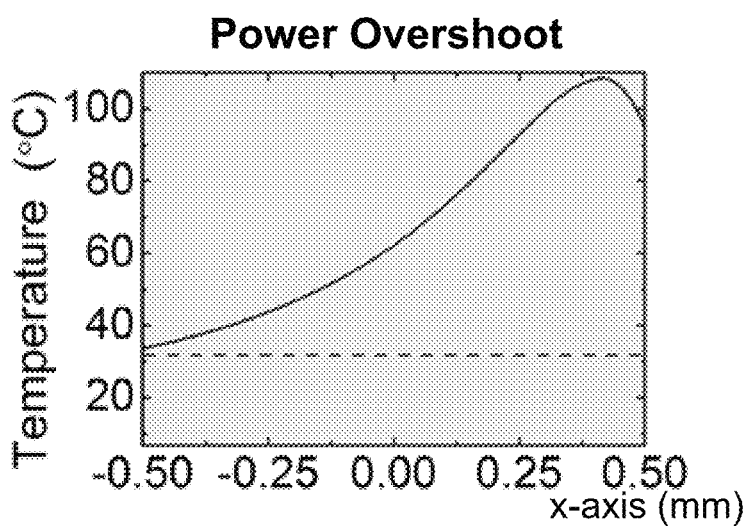

Tropism of embodiments of the invention offer a much larger operation window where an accurate, stable state of aiming will not be lost when system parameters (such as incident power, ambient temperature, etc.) are changed. FIGS. 7A-7C provide schematics of instances where the input power under a 90° (zenith) illumination is insufficient (FIG. 7A), within the operation window (FIG. 7B), and too high (FIG. 7C) for an embodiment of the invention. When the power is insufficient, the input optical power (16) (50 mW 1 mm-beam diameter laser for this embodiment) cannot generate enough asymmetric volume change to achieve 90° bending of the elongated body (10), and the bending will be stopped at a smaller angle as shown in FIG. 7A. On the other hand, if the incident input power is too high, both front and back-side temperatures of the pillar (10) would be higher than the LCST, resulting in a power overshooting case as provided in FIG. 7C (1000 mW for this embodiment); the elongated body (10) would shrink on both sides, diminishing the tracking ability. FIG. 7B shows that an input power of 200 mW is within the operation window for this embodiment, and the pillar (10) accurately bends 90° to track the incident energy (16). Although any suitable operational window may be engineered into the phototropic materials, according to some exemplary embodiments of the invention, the operation window of input photonic power for successful tracking by the device is about 50-700 mW, about 100-650 mW, about 200-600 mW, and about 300-450 mW, for 20°, 55°, 90°, and 120° incident angles (zenith), respectively. FIGS. 8A-8C show how the temperature-x-axis graph varies depending on whether the power is insufficient (FIG. 8A), within the operation window (FIG. 8B), or too high (FIG. 8C). FIGS. 7A-8C highlight the importance of generating an effective temperature gradient along the light path across the elongated body (10) to achieve desired bending and tracking.

Figure 9A:
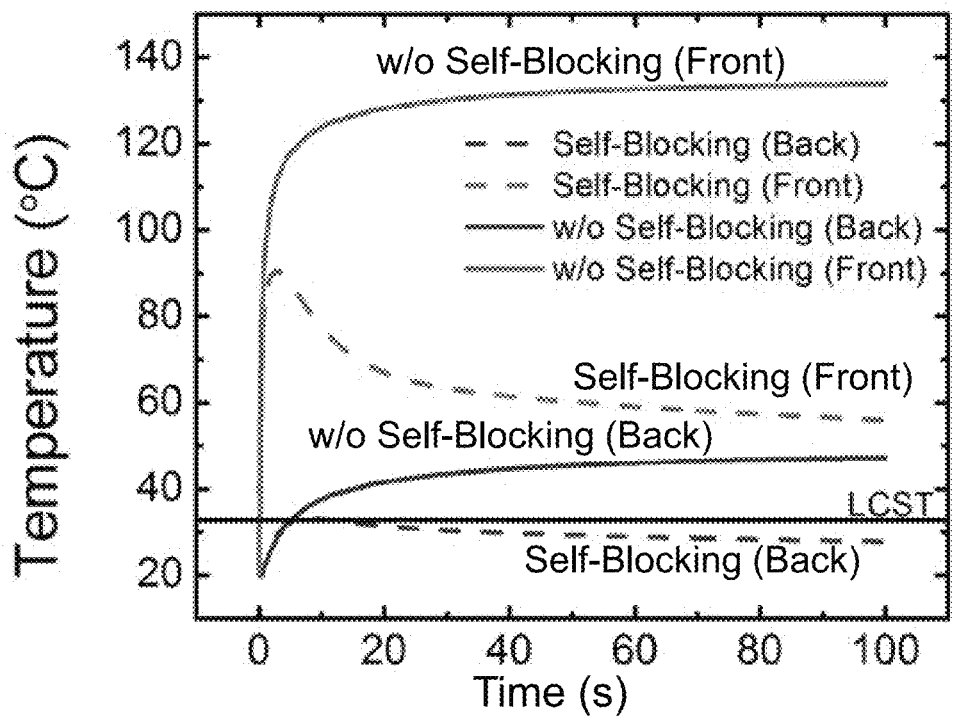
FIG. 9A provides a graph showing self-blocking-induced temperature regulation for an exemplary embodiment of the invention.
Figure 9B:
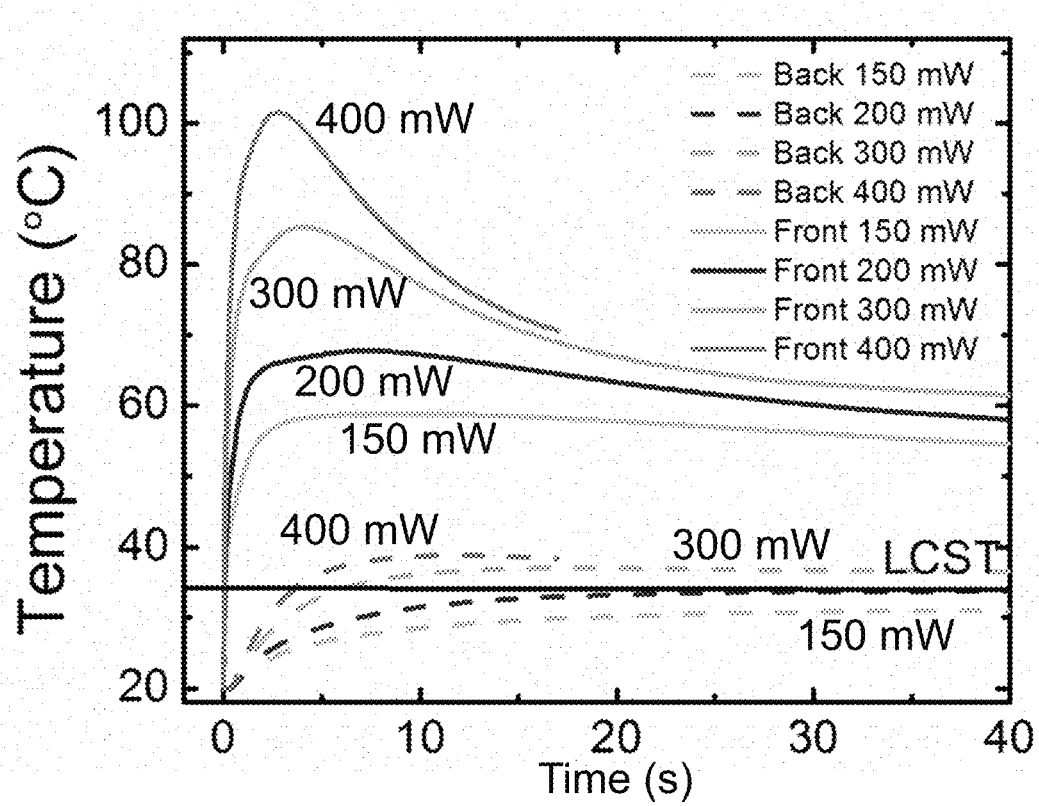
FIG. 9B provides a graph showing temperature regulation due to self-blocking, resulting in similar temperatures for different input photonic power in accordance with an exemplary embodiment of the invention.
Figure 10A:
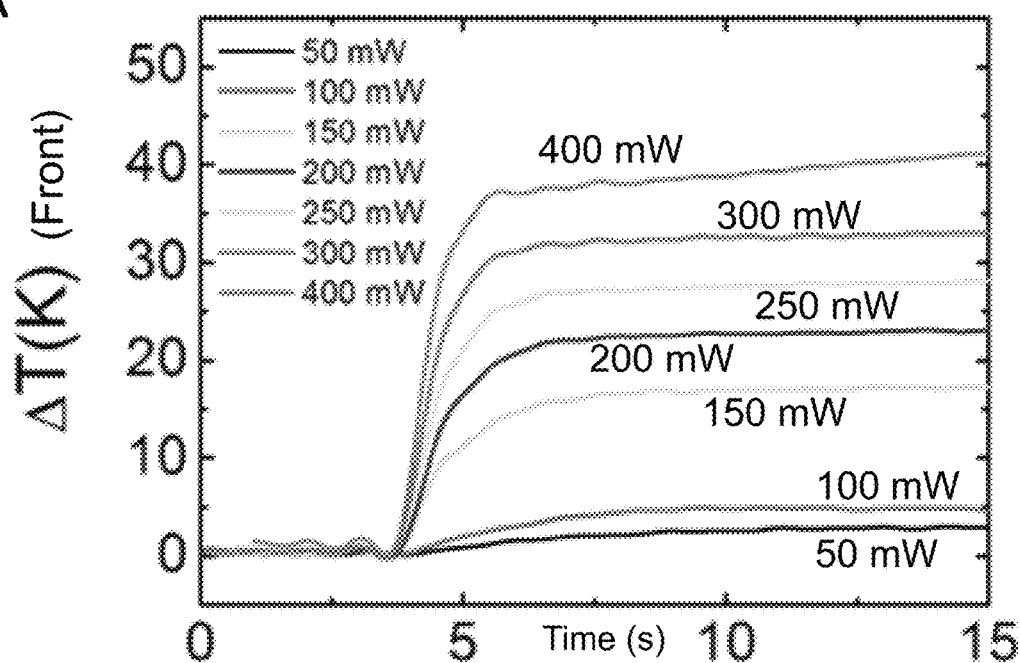
FIGS. 10A and 10B provide graphs showing recorded temperature variation on the front (FIG. 10A) and back (FIG. 10B) of a tropistic device in accordance with an exemplary embodiment of the invention.
Figure 10B:
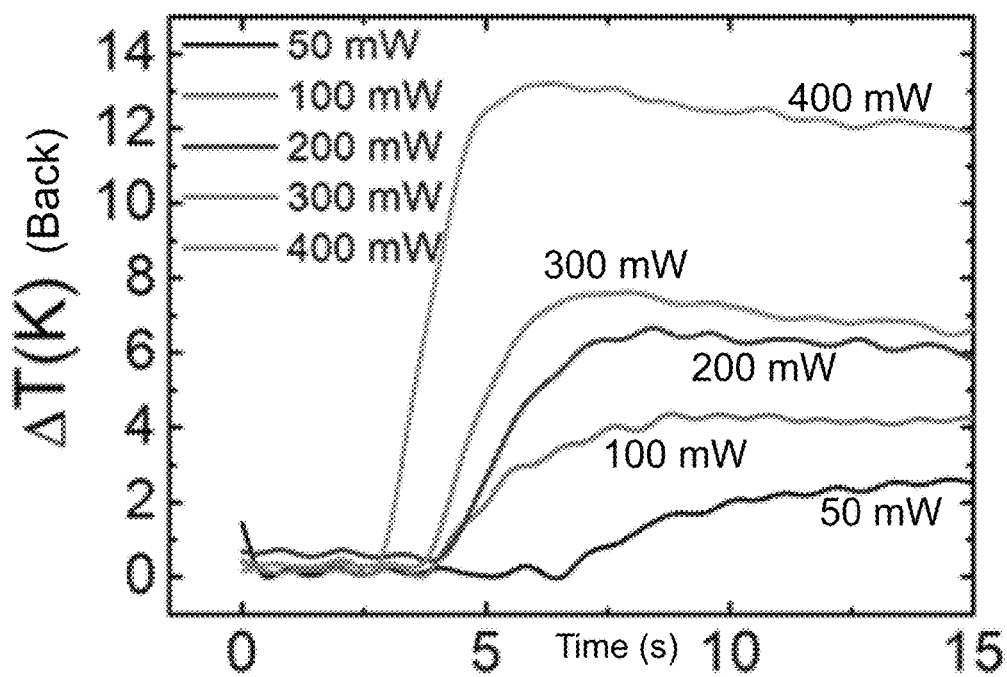

Additionally, FIG. 9A provides a graph demonstrating self-blocking-induced temperature regulation for an exemplary embodiment of the invention. This self-blocking effect effectively regulates the temperature distribution across the elongated body (10) in accordance with many such embodiments, allowing stable and accurate aiming-states to light sources (16) under different input photonic powers. As further provided by FIG. 9B, exemplary embodiments of the invention are able to generate similar temperature gradients despite the varying input photonic powers due to the strong temperature-regulation by the self-blocking effect. Due to such self-blocking, temperature on the illuminated front and back is reduced while the body (10) bends toward incident light (16). Without the self-blocking effect, the temperature on the illuminated front and back would be over the LCST. In many embodiments of the invention, such stable aiming-states are not changed if the input light power increases by a limited value due to the self-blocking-induced negative feedback. FIGS. 10A and 10B also provide graphs showing recorded temperature variation on the front (FIG. 10A) and back (FIG. 10B) of a phototropic device in accordance with an exemplary embodiment of the invention. In some such embodiments, the time-dependent temperature of the incident-front and back may be recorded by thermocouples gently in contact with the positions of interest.

Figure 11A:
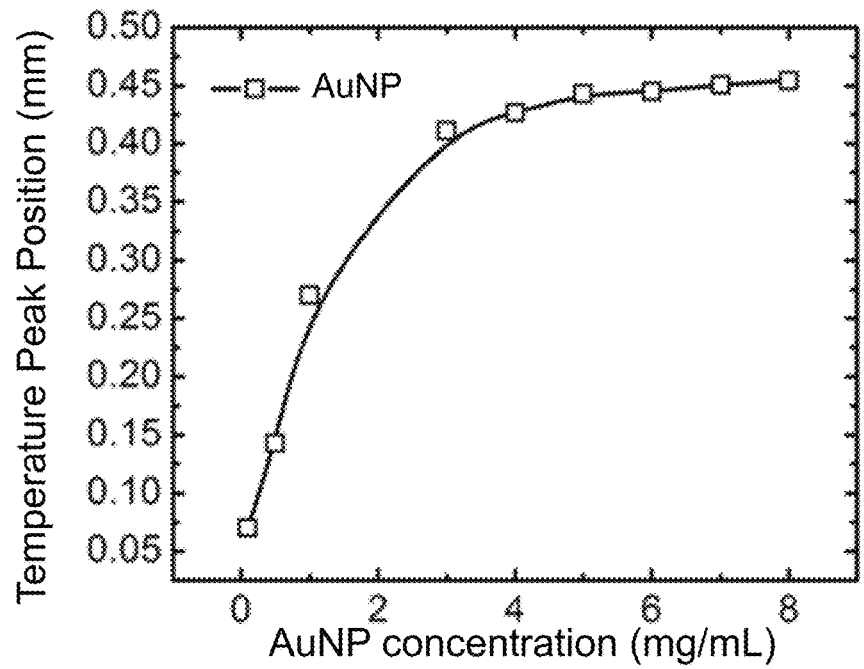
FIG. 11A provides a graph relating optical penetration depth and AuNP (absorber) concentration for an embodiment of the invention.
Figure 11B:
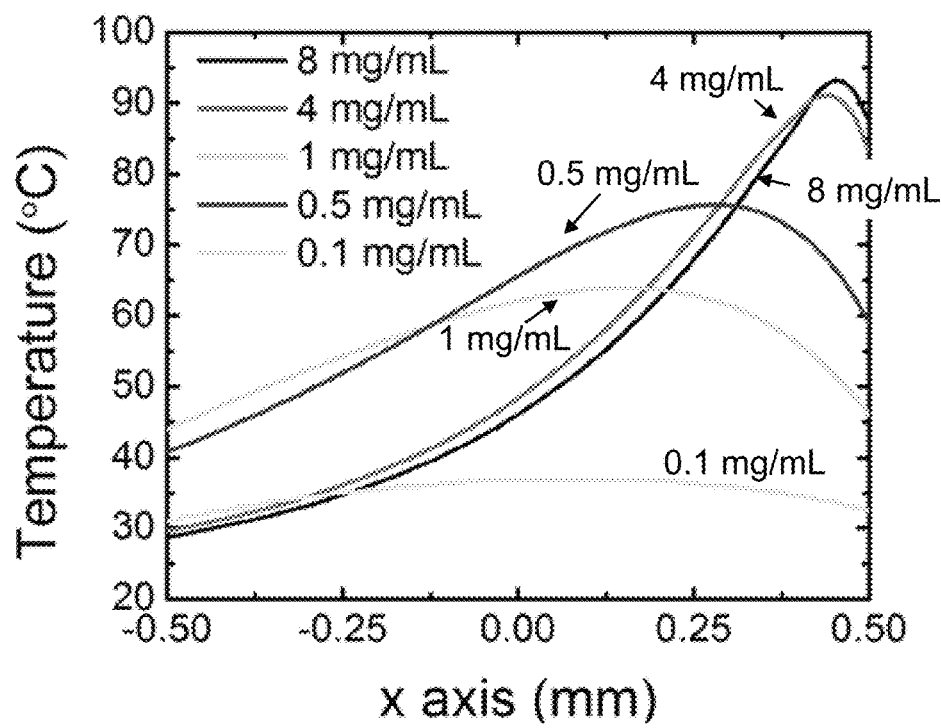
FIG. 11B provides a graph showing the temperature gradient across the elongated body depending on the absorber concentration for an embodiment of the invention.

The nature of photo-thermal energy conversion implies that the absorber (14) concentration can dramatically affect the temperature gradient formed in the elongated body (10). The role of absorber (14) concentration can be assessed by Lorenz-Mie theory and Beer-Lambert Law. For instance, for some embodiments, in an extreme case when the absorber (14) concentration is quite low (0.1 mg/mL in some exemplary embodiments), the device will be almost transparent to the incidence (16). A large temperature difference cannot be maintained in a final equilibrium state, leaving the hydrogel (12) in a symmetric shrunken state. Thus, many embodiments of the invention incorporate a high concentration of absorbers (14) in order to generate a large asymmetry of temperature and a suitable temperature gradient. FIG. 11A provides a graph relating optical penetration depth (by observing the temperature peak position) and AuNP (absorber) (14) concentration for an embodiment of the invention. FIG. 11B provides a graph showing temperature gradients across the elongated body (10) for different absorber

Figure 12A:
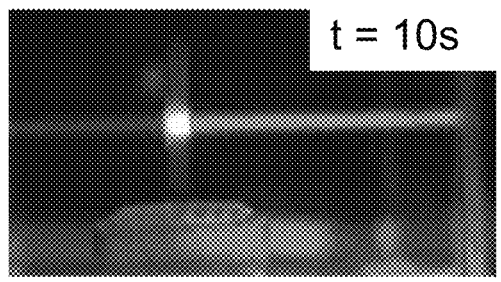
FIGS. 12A-12D provide images of micropillars (Φ=200 μm) bending toward the incident light (500 mW laser at 534 nm) in accordance with exemplary embodiments of the invention, where FIGS. 12A and 12B (10×) and FIGS. 12C and 12D (20×) and represent two different samples containing different amounts of nanoparticles.
Figure 12B:
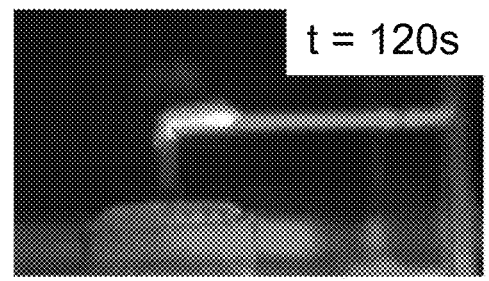
Figure 12C:
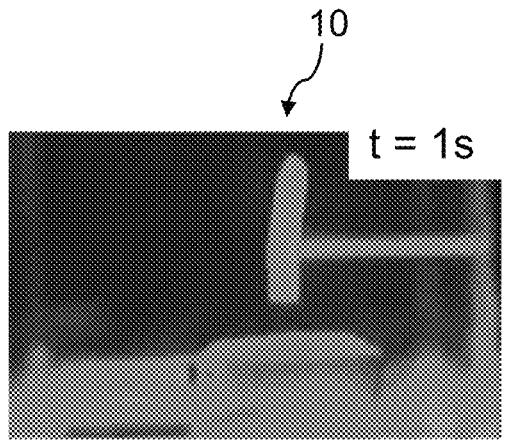
Figure 12D:
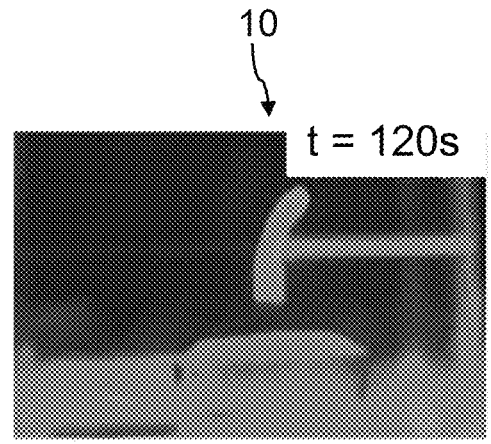
Figure 12E:
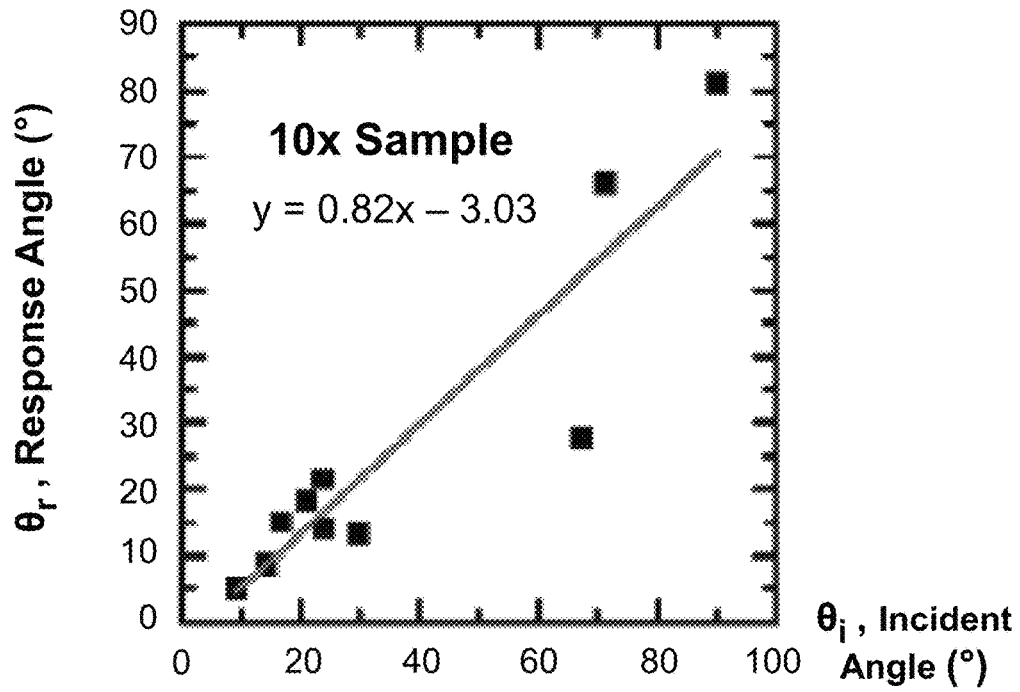
FIGS. 12E and 12F provide graphs of measured response bending angles in relation to various incident light angles for the two different samples (10× and 20×, respectively).
Figure 12F:
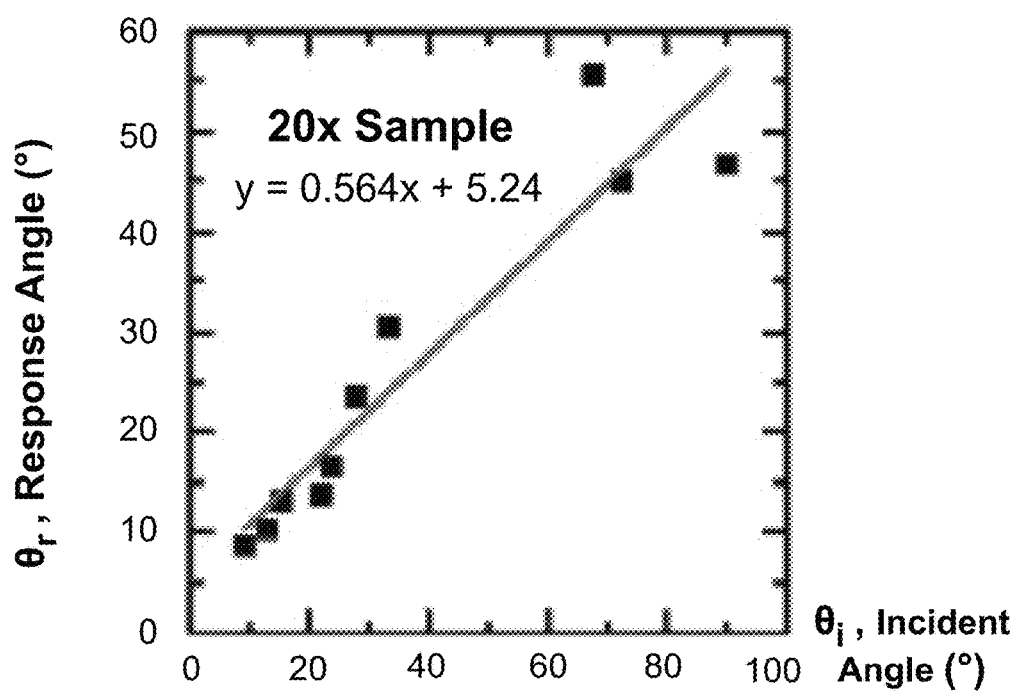

(14) concentrations for some exemplary embodiments of the invention. Additionally, FIGS. 12A-12D provide images of deformable micropillars (10) (ϕ=200 μm) bending toward incident light (16) (500 mW laser at 534 nm) in accordance with some other embodiments of the invention. Here, the incident light (16) is at a 90° angle with respect to the longitudinal axis of the phototropic micropillar (10). FIGS. 12A and 12B (10×) and FIGS. 12C and 12D (20×) represent two different samples containing different amounts of nanoparticles (14). FIGS. 12E and 12F provide graphs of measured response bending angles in relation to various incident light (16) angles (10° to 90°) for the two different samples (10× and 20×, respectively) in such embodiments. As shown by FIGS. 12A-12F, the concentration of photosensitive nanocomponents (14) affects the response behavior, such as bending angles and bending speed, in many embodiments of the invention.

Figure 15A:
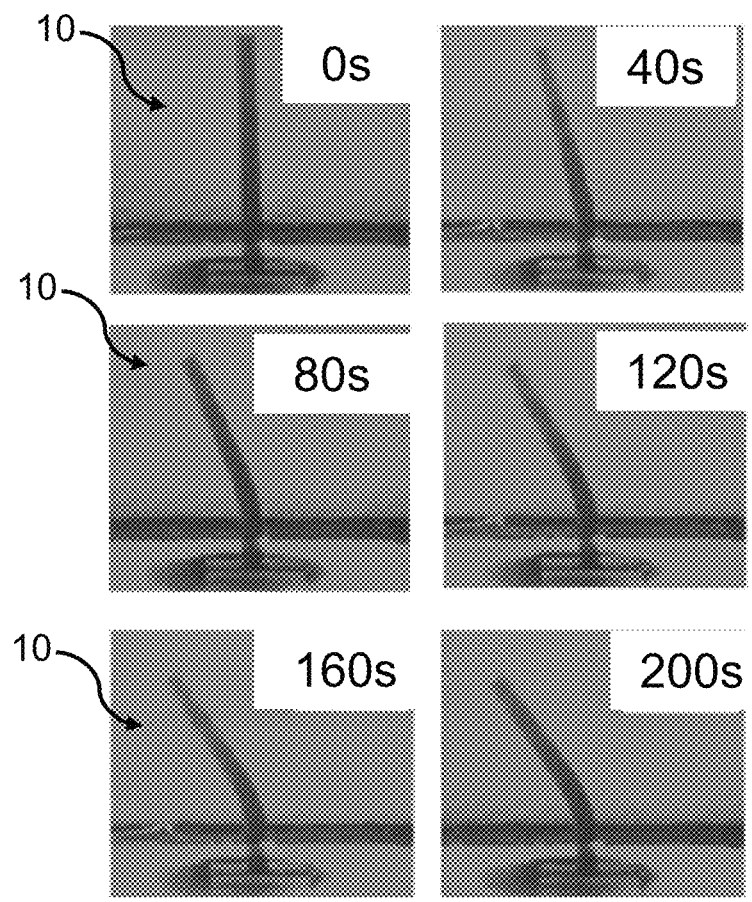
FIGS. 15A and 15B provide images and a graph showing the response time of the dynamic process of a micropillar bending towards incident light in accordance with an exemplary embodiment of the invention.
Figure 15B:
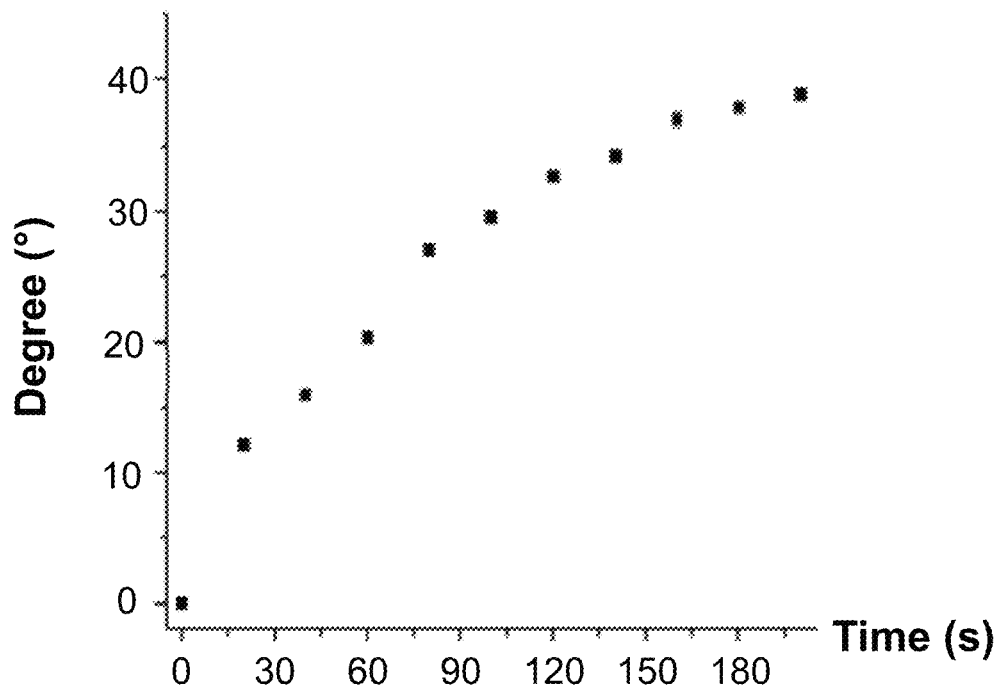
Figure 16A:
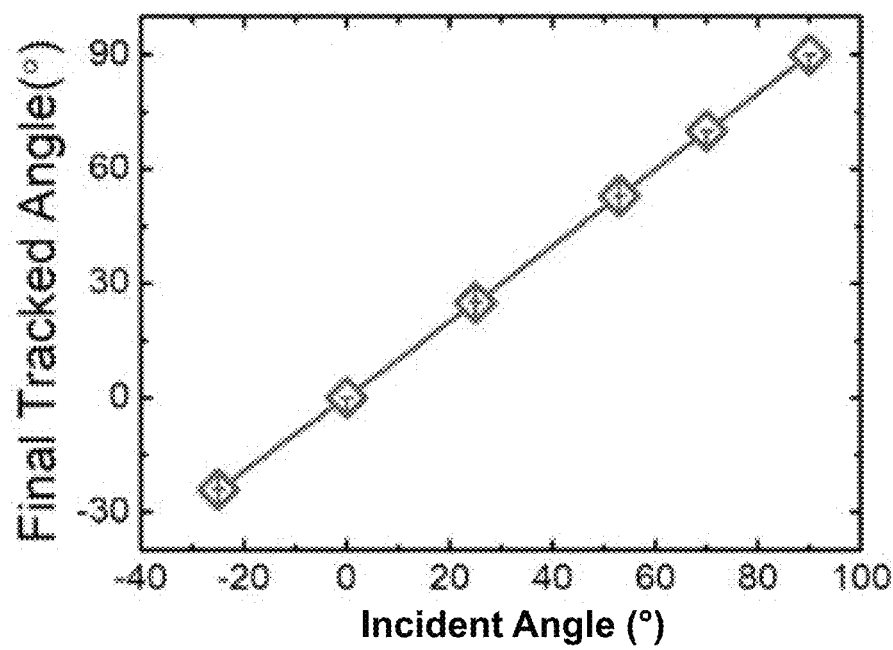
FIG. 16A provides a graph showing the final tracked angle in relation to the incident angle in accordance with an exemplary embodiment of the invention.
Figure 16B:
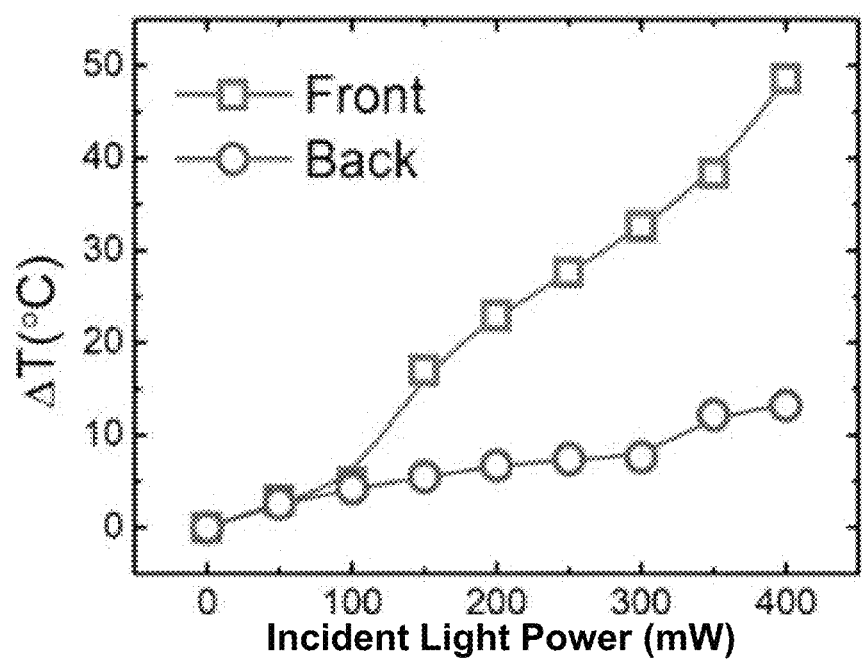
FIG. 16B provides a graph showing the relation of temperature and incident light power in accordance with an exemplary embodiment of the invention.

FIGS. 13A-13B provide images showing the incident angle ($\theta_I$) and response angle ($\theta_R$) for a bending micropillar (10) in accordance with embodiments of the invention. Further, FIG. 14 provides a graph showing the response rate, or speed, of a bending micropillar (10) under illumination from 3° to 90° at intensities of 100 mW to 500 mW. In addition, FIGS. 15A and 15B provide images (FIG. 15A) and a graph (FIG. 15B) showing the response time of the dynamic process of a micropillar (10) bending towards incident light (16) in accordance with yet another exemplary embodiment of the invention. As further shown by FIG. 16A, phototropic material devices formed in accordance with embodiments show remarkable device-light (16) alignment. The embodiment in FIG. 16A was illuminated by a laser (300 mW, 1 mm diameter) (16) with a beam diameter equal to the diameter of the pillar (10). FIG. 16B shows the relationship between temperature and incident light power for the front and back sides of a pillar (10) in accordance with some embodiments.

Figure 17B:
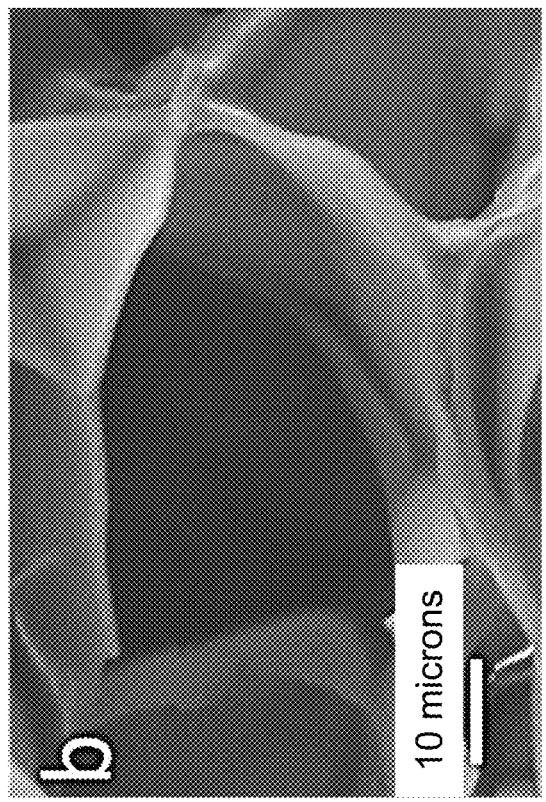
FIGS. 17A and 17B provide SEM (scanning electron microscope) images of PNIPAAm hydrogel pore sizes used in exemplary embodiments of the invention.
Figure 17A:
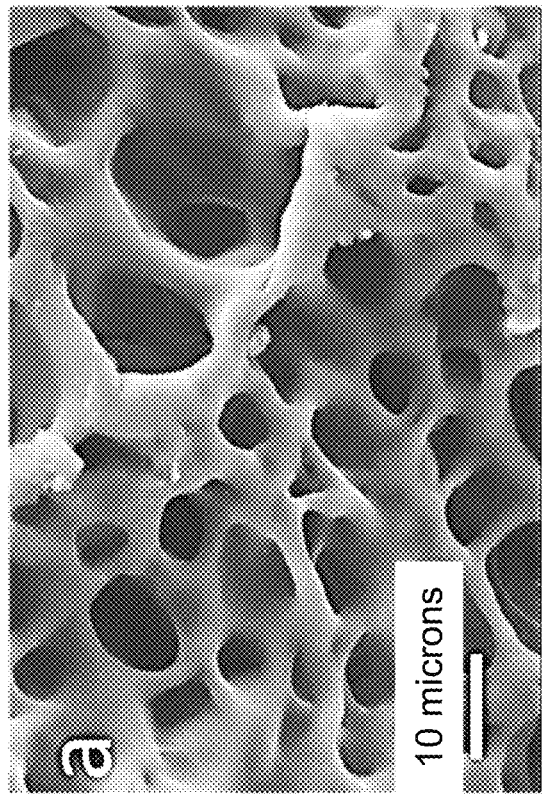

According to various embodiments of the invention, the kinetics of the tropistic locomotion is jointly defined by the processes of thermal diffusion and the mass (water) diffusion. Thermal diffusion is normally stable once the hydrogel (12) is formed, as the thermal conductivity and the specific heat capacity is almost the same in the majority of the elongated body (10), even during the morphological change process. However, mass diffusion can be dramatically manipulated in embodiments of the invention by facially controlling the porous size of the hydrogel (12). FIGS. 17A and 17B provide SEM (scanning electron microscope) images of PNIPAAm hydrogel pore sizes used in some embodiments of the invention. Smaller pore sizes of about 5 to 10 microns (as in FIG. 17A) lead to a relatively slow water diffusion in and out of the hydrogel matrix, resulting in a mass-diffusion-dominated device for some embodiments. Larger pore sizes of around 50 microns (as in FIG. 17B) lead to a much faster water diffusion in and out of the hydrogel matrix, resulting in a thermal-diffusion-dominated device for other embodiments. FIGS. 18A and 18B provide schematics comparing the time-dependent phototropic locomotion in phototropic devices with different dominating diffusion mechanisms in accordance with some embodiments of the invention. When mass diffusion is fast (for instance, when water diffusion of the hydrogel matrix can be finished as the temperature gradient is formed), the speed for the successful tracking is limited by thermal diffusion.

As shown in FIG. 18A, an exemplary embodiment of the invention that is limited by thermal diffusion achieves 90° tracking in about 3.5 seconds, which is comparable to the time cost for forming the thermal equilibrium state. Embodiments of mass diffusion dominated devices, as represented in FIG. 18B, have much smaller pore sizes, leading to slower water diffusion. Thus, those embodiments will exhibit longer response times to achieve 90° tracking—in the embodiment provided in FIG. 18B, it took about 40 seconds, which is much longer compared to 3.5 seconds for the embodiment of FIG. 18A. As the macro-scale and micro-structure of the hydrogel (12) matrix provide flexible tenability of kinetic properties of the phototropic devices formed in accordance with various embodiments of the invention, once the material system has been fabricated, one can still readily control the temporal response of the system and device by varying input photonic power, as discussed above. In some such embodiments, the time cost of successful 90° tracking varies from hundreds of seconds to seconds, as long as the input power falls into the operation window previously mentioned. FIG. 18C provides a graph of a kinetic study comparing the deswelling ratio of devices with different dominated diffusion mechanisms according to some embodiments of the invention.

Figure 19A:
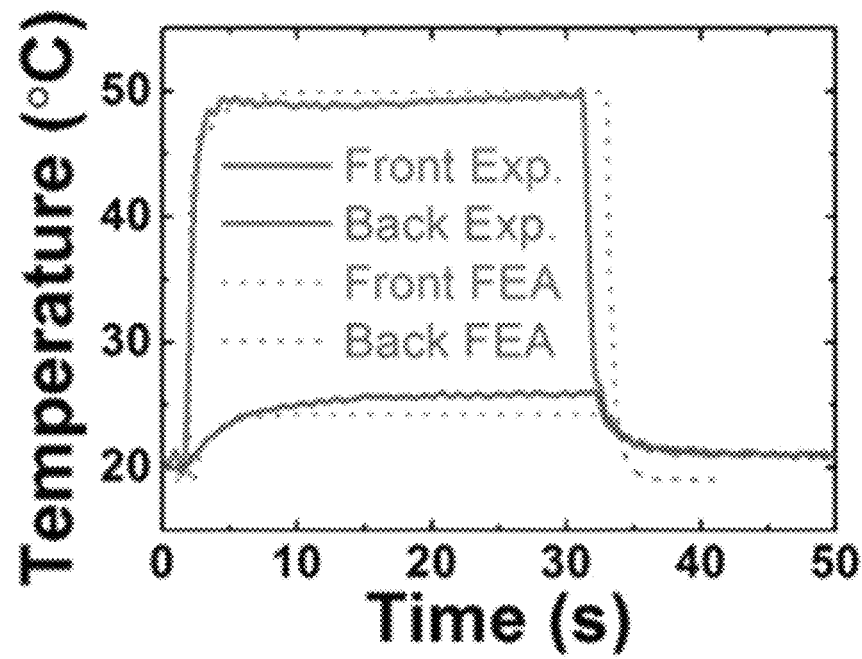
FIG. 19A provides a graph showing experimental and simulation results of the temperature evolution of the illuminated front and back of a device in accordance with an exemplary embodiment, when a laser is shined on the side surface and turned off 30 seconds later.
Figure 19B:
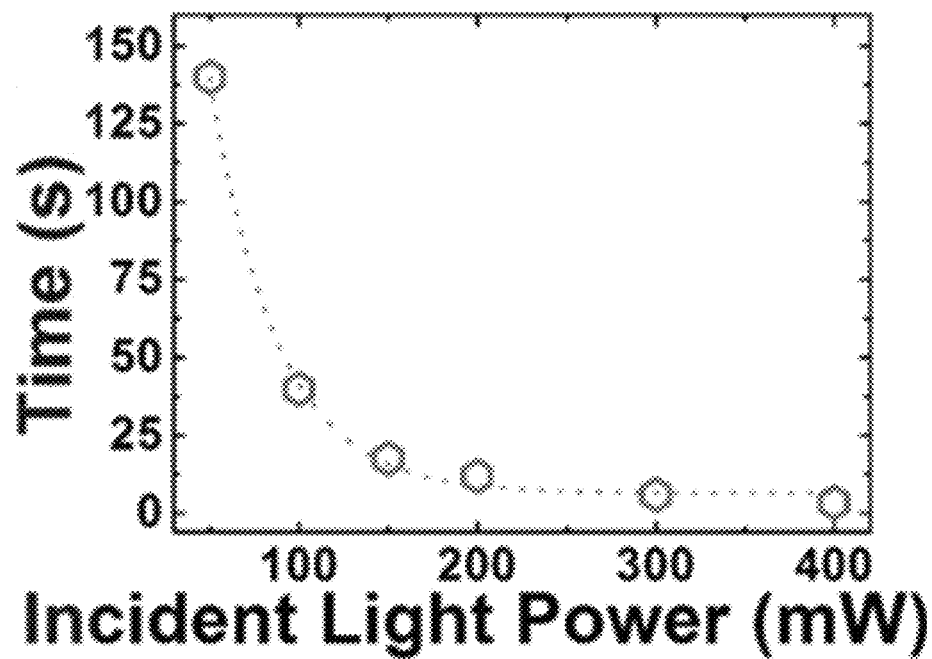
FIG. 19B provides a graph showing time taken to achieve 90° tracking with respect to incident light power in accordance with an exemplary embodiment.

FIG. 19A provides a graph showing experimental and simulation results of the temperature evolution of the illuminated front and back of a device in accordance with some embodiments, when a laser is shined on the side surface and turned off 30 seconds later. The solid lines of the graph represent the experimental results, while the dotted lines show the simulation results. FIG. 19A shows the time cost for the forming of a thermal equilibrium state, which is comparable to the 3.5 second tracking time of FIG. 18A for such embodiments. FIG. 19B provides a graph showing time taken to achieve 90° tracking with respect to incident light power for some embodiments, further demonstrating that the temporal response may be controlled by varying input photonic power.

Figure 20:
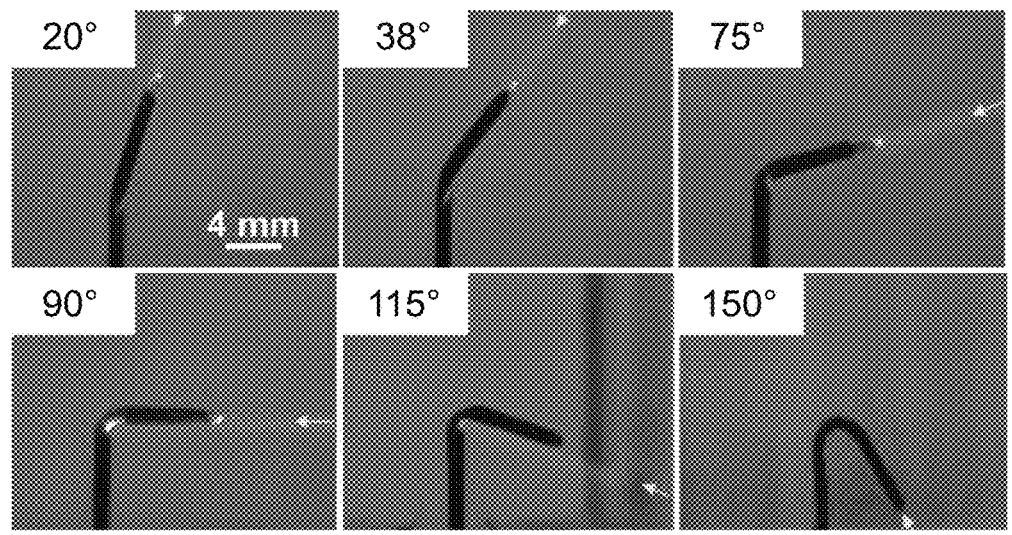
FIG. 20 provides images of a cylindrical tropistic material device in accordance with embodiments of the invention, illuminated by a laser at various zenith angles.
Figure 21:
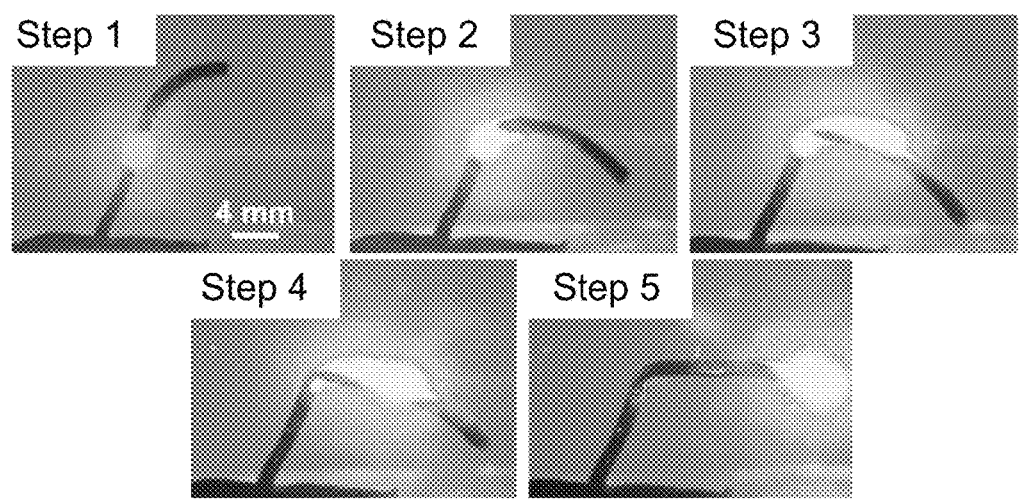
FIG. 21 provides images of a tropistic material device in accordance with embodiments of the invention, demonstrating a self-correction ability.

According to many exemplary embodiments of the invention, phototropic behavior exhibited by AuNP-incorporated devices is capable of tracking photonic input (16) from normal (zenith angle 0°) to 150° to the longitudinal direction of the pillar, benefitted from the great swelling ratio of the hydrogel (12). To illustrate, FIG. 20 provides images of a cylindrical phototropic material device in accordance with some exemplary embodiments of the invention, illuminated by a laser at various zenith angles (from 20° to 150°). The device in FIG. 20 exhibits significant robustness and tracking accuracy, with an error less than 0.5%. FIG. 21 provides images of still another exemplary embodiment, where the device exhibits a self-correction of its original irregular shape, performing robust tropism. The device was intentionally fabricated to have an irregular shape, which was a tilted curved cylindrical pillar. As mentioned above, the device is readily tunable by system parameters such as pillar (10) dimension, gel LCST, gel rigidity, gel swelling ratio, etc.

In various exemplary embodiments of the invention, the accurate state of aiming is also mechanically stable due to the strong clamp at the illuminating site where the mechanical modulus on-site is dramatically increased owing to the shrinkage of the hydrogel (12). In such embodiments, the capability to bend to large angles is mostly powered by the shrinkage on the front of the pillar (10) to the illumination (16), as the back side does not exhibit much of a stretch. Thus, the wide-angle tracking ability will not be affected by the tensile strength of the hydrogel, adding to the degree of freedom in choosing materials for the tropistic system design in accordance with embodiments of the invention. The limited stretching field on the back side also suggests that the bending process of the system in accordance with many embodiments is more closely related to the temperature gradient across the pillar (10) and the water diffusion in and out of the hydrogel matrix, than a conventional case of flexural beam bending (governed by the flexural modulus).

Figure 22A:
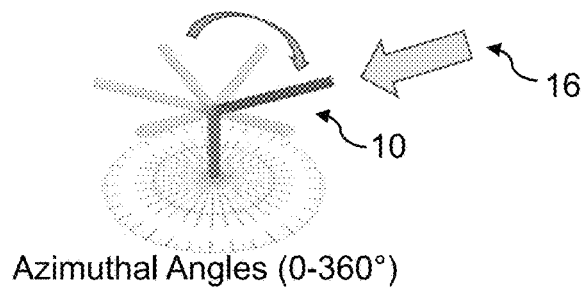
FIG. 22A provides a schematic demonstrating the omnidirectional tracking capabilities of exemplary embodiments of the invention.
Figure 22B:
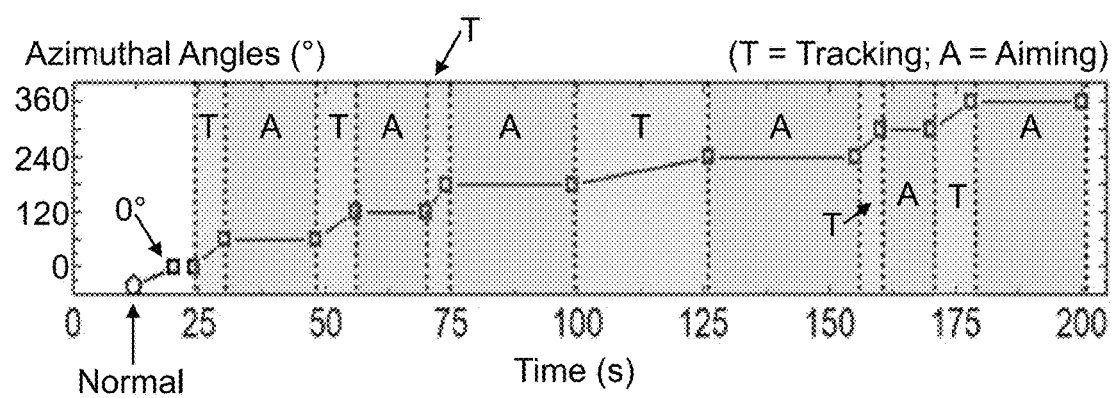
FIG. 22B provides a graph showing the temporal evolution of the omnidirectional tracking of devices in accordance with some such embodiments.

Further, such embodiments track 360° azimuthally in the horizontal plane. A schematic representing such an embodiment is provided in FIG. 22A. In such embodiments of the invention, the device instantly responds to varying incident angles from a laser (16), turning and aiming the tip of its elongated body (10) toward the incident direction in a time scale of seconds. FIG. 22B provides a graph showing the temporal evolution of the omnidirectional (azimuthal angles 0° to 360°) tracking of devices in accordance with some such exemplary embodiments. Further, the device can aim toward the emissive source (16) without over-bending or under-bending, demonstrating extremely precise spatiotemporal control and stable, omnidirectional, tracking behavior. In still other embodiments, the elongated body (10) is compositionally and geometrically symmetric, adding to the stability and accuracy of the tropistic device. In many exemplary embodiments of the invention, when incident emission (16) is off or changes position, the bent elongated body (10) immediately recovers to its original shape or quickly adjusts the bending angle adaptively to track the new stimulus position, performing another tracking cycle and real-time continuous tracking. For such embodiments, bending is fully recoverable; bending/recovering is morphologically reversible for a 360-degree tropism.

In yet other embodiments of the invention, the curvature formed in the elongated body (10) at final state of aiming can be readily manipulated by area of the illumination or incident impulse (16). For example, for many embodiments of the invention, a narrow spot laser would induce small curvature of bending, and incidence with larger area would result in larger bending curvature when the phototropic locomotion is complete. FIGS. 23A-24B provide images and schematics of a pillar-shaped phototropic device in accordance with embodiments exposed to a narrower spot light (FIGS. 23A and 24A) and a wider area light (FIGS. 23B and 24B). FIGS. 25A and 25B provide schematics of the horizontal cross section of a pillar-shaped phototropic device in accordance with embodiments exposed to a narrower spot light (FIG. 25A) and a wider area light (FIG. 25B). The cross sections are at the height that exhibits the highest temperature and the incident front; the outer circle describes the original morphology of the cross section of the device. Such morphological control is another benefit for applications that involve self-adaptive light guiding systems employing total internal reflection.

The ambient temperature and LCST also play important roles to the operation window of the incident power. In some embodiments, when ambient temperature is much lower compared to the LCST, the required power for initiating bending of the elongated body (10) is higher, but the operation window for incident power is wider because it also takes more power to overshoot the backside temperature. On the other hand, the closer the ambient temperature is to the LCST, the elongated body (10) would bend with much smaller input power to lift the front temperature over LCST, but the operation window of the input power density is narrower. In some exemplary embodiments, the mechanism to realizing the light-adaptive deformation is to generate an effective temperature gradient along the light path (16) across each phototropic pillar (10), which will then allow the phototropic system to precisely point toward and harvest the incident light (16). In some such embodiments, the elongated body (10) further comprises a lens-antenna on its tip with high alignment and μ-sec response rate.

Further simulations and modeling may be done by also using finite element analyzing tools such as COMSOL in addition to Drude and Lorenz-Mie theories, the heat and mass diffusion equations, and the Beer-Lambert law. Additionally, the tracking action of hydrogel pillars (10) in many embodiments of the invention is a transient multi-physics process, mainly involving mass diffusion of water into, or out of, a gel, a large deformation of the gel network, and a heat transfer process. The complicated behavior may be modeled by nonlinear field theory coupling large deformation and mass diffusion in addition to heat transfer theory and commercial multi-physics modeling software mentioned above. In some embodiments, the intrinsic diffusivity may be obtained from results of experimental swelling ratio tests of the hydrogels (12). For many exemplary embodiments, the concentration of lab-made AuNP (14) is determined by inductively coupled plasma mass spectrometry.

Implementations of Tropistic Material Systems in Devices

Figure 27:
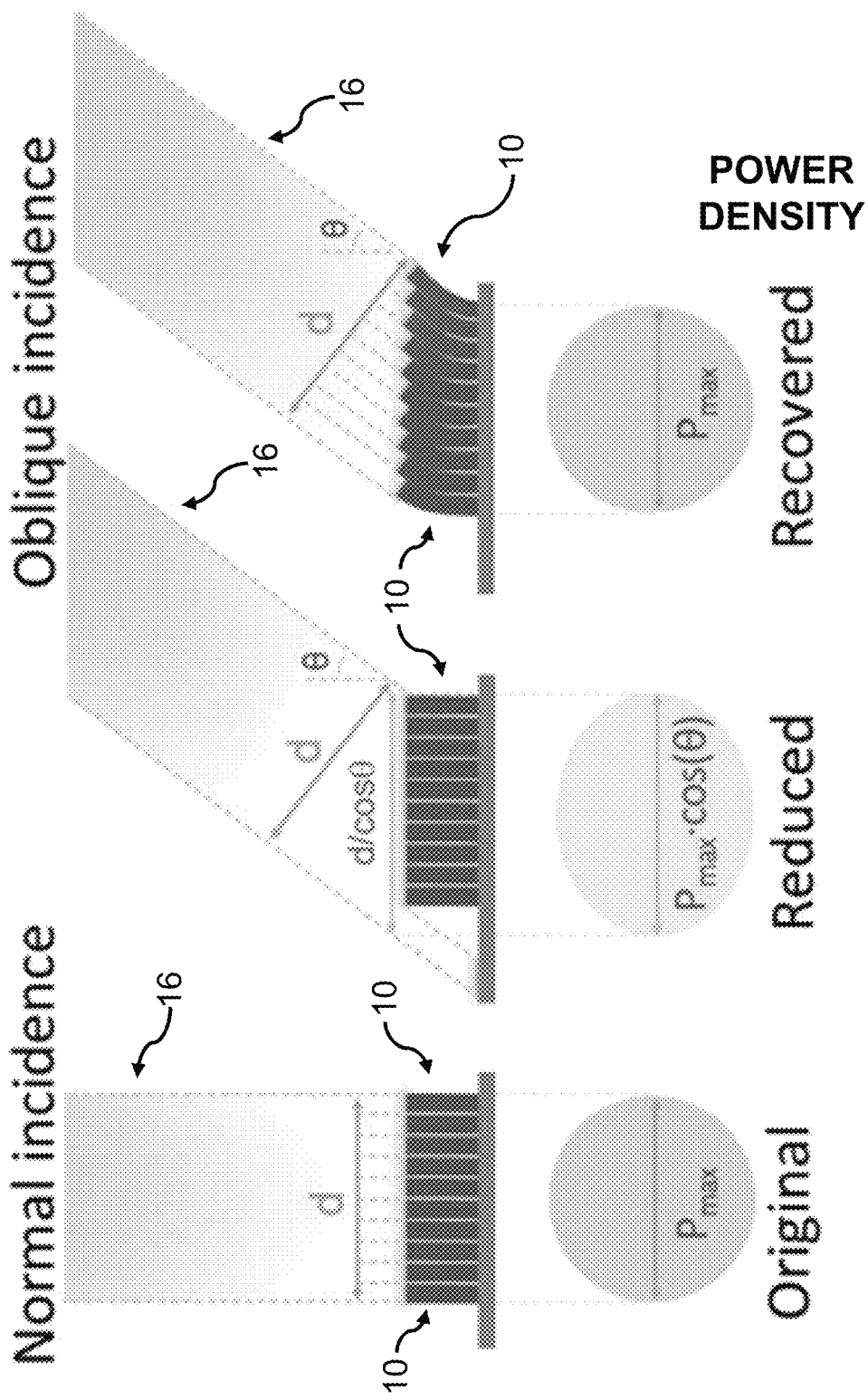
FIG. 27 provides a schematic illustrating oblique loss compensation in accordance with exemplary embodiments.

As shown in FIG. 26A, in yet other embodiments of the invention, a plurality of the elongated bodies (10) are arranged in an array. Some such embodiments allow angle-independent solar vapor generation (SVG) that maintains the highest vapor production under white-light illumination of various arbitrary angles as high as 75°, demonstrating a significant recovery of oblique-incident energy loss up to 400%. In other such embodiments, oblique energy loss is reduced due to the surface covered with pillars (10) (the array) that bend toward light (16) and maintain the top surface normal to the incidence. FIG. 27 provides a schematic illustrating such instances of oblique loss compensation. Considering an array system formed by a series of cylindrical devices, the top surface of the elongated bodies (10) would receive less power density under an oblique illumination compared to an illumination normal to the top surface, causing the oblique loss (OL) in power density. If the tip surface of the device is maintained perpendicular to the light illumination (16), the system is capable of maintaining the received power density in oblique incidence to that in normal incidence. Unsurprisingly, it is advantageous for various applications if the pillars (10) can self-orient to fully autonomously track and aim at the light source (16) when the incident angle varies, which is in accordance with various embodiments of the invention. Automatic and omnidirectional compensation would generate the maximum receiving power density regardless of the incident angle. For some SVG studies, other such embodiments involve an array of pillars (10) maintained at the water/air interface inside a container, such as a water bath (as in FIGS. 28A and 28B). These studies may also use a control sample without the elongated bodies (10) such as that shown in FIG. 26B for some such embodiments.

An experimental setup as shown in FIG. 26C may be employed to study angular-invariance of SVG for some embodiments of the invention. In accordance with such embodiments, the absorber-incorporated elongated bodies (10) act as photonic absorbers, so the photonic energy will be absorbed by the device during illumination and converted into thermal energy. In turn, the rising temperature on the pillar (10) surfaces elevate the evaporation rate of the system, and mass flux of escaping vapor can be recorded by a precision scale to evaluate the amount of energy employed for bulk water molecules to evaporate into vapor form. FIGS. 28A and 28B provide schematics of such an exemplary array of cylindrical elongated bodies (10) designed to track light incidence and maintain their tip surface normal to the incident direction, maximizing input power density. A phototropic device with a photonic absorber array in accordance with such embodiments of the invention may be designed for omnidirectional SVG under variable angles of solar illumination. FIGS. 29A and 29B provide schematics of a detailed view of one such array and the bending motion resulting from light incidence (16). In some such embodiments, the device contains a 5×7 micropillar (10) array, where the micropillars (10) are 300 μm in diameter and 1 mm in height.

Figure 30:
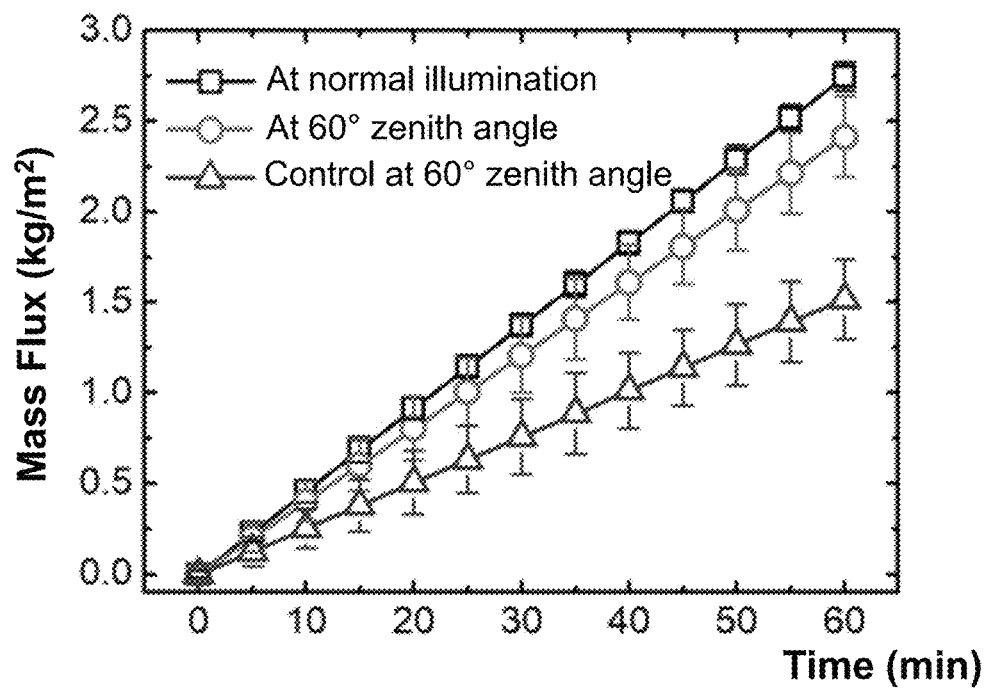
FIG. 30 provides a graph comparing time-dependent mass flux of solar vapor generation under normal illumination and 60° zenith angle illumination for an exemplary embodiment.
Figure 31:
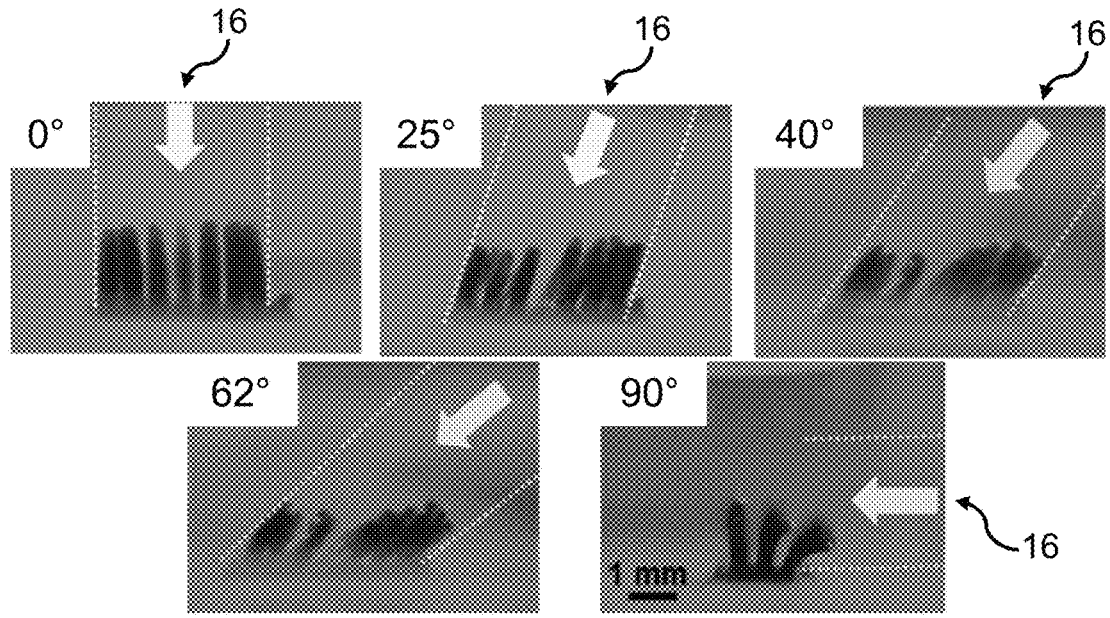
FIG. 31 provides images of a tropistic device in accordance with some embodiments containing an array of elongated bodies incorporated with AuNPs.

With exemplary embodiments of the invention, the tropistic systems and devices solve the universal issue of oblique incidence-induced power density loss of almost any energetic emission. Due to the tropism, the tips of the device cylinders (10) in the array above can always receive the maximum photonic energy density and thus compensates for the input energy loss compared to a non-tropistic textured surface. Such embodiments further demonstrate the versatility of accommodating various light sources with either a signal wavelength or a broad spectrum. Under normal incidence, some exemplary embodiments exhibited an efficiency of SVG of 70% for 1-Sun illumination and 80% for 2-Sun illumination. FIG. 30 provides a graph comparing time-dependent mass flux of solar vapor generation for an exemplary embodiment under normal illumination and 60° zenith angle illumination with a control sample. The graph shows that the device exhibited a SVG performance under 60° illumination that is comparable to that of normal incidence, while the control sample exhibits a deteriorated performance. FIG. 31 provides images of a phototropic device in accordance with some such embodiments containing an array of elongated bodies (10) incorporated with AuNPs (14). In this embodiment, the array tracks a laser with 532 nm wavelength and a beam diameter of 10 mm; the zenith angle of the incidence (16) varies from 0° to 90°.

The efficiency of the SVG at varying incident angles should be defined as:

$$\eta_{svg} = G_\theta * h_{LV}/P_\theta * C_{opt},$$

where $G_\theta$ is the angular-dependent flux of water vapor, $h_{LV}$ the latent enthalpy of liquid-vapor phase transition, $P_\theta$ the actual input power density which varies under different incident zenith angles θ, and $C_{opt}$ the optical concentration. For some embodiments of the invention, the normalized SVG is defined as:

$$\eta_i = G_\theta * h_{LV}/P_i * C_{opt},$$

where $P_i$ is the input power density under normal incidence ($P_i = P_\theta(\theta=0)$). In this definition, vapor generation measured at all different zenith incident angles are normalized by the one input photonic power density at normal incidence, resulting in angle-dependent values that are comparable to efficiencies previously reported at normal incidence.

Under the oblique incidence of 60°, under which the input energy density should be reduced to 50% of that of normal incidence for a flat surface, devices formed in accordance with some exemplary embodiments of the invention maintained 90% of $G_\theta$ under the normal incidence, compared to 55% for a control sample without an array of elongated bodies (10). The $\eta_i$ under different zenith incident angles in a −90° to 90° vertical plane at 1-Sun and 2-Sun illumination respectively all show enhanced performance under oblique incidence compared to control samples with non-phototropic, textured microstructures. The angle-dependent SVG for the devices manufactured in accordance with such embodiments remained angle-independent from normal to 60° under 1-sun and to 75° under 2-sun illumination, compared to the dramatically reduced SVG under higher incident zenith angles, in both theoretical estimates and control samples. Such an angle-independent SVG demonstrates significant phototropism-enabled oblique-loss compensation, with an enhancement up to 400%, attributed to the tropistic behavior of embodiments of the invention. In addition, some exemplary phototropic array devices formed in accordance with embodiments of the invention are capable of tracking the incident direction horizontally, performing a constant SVG throughout the 360° azimuth angle range.

For example, FIGS. 32A and 32B provide graphs showing the measured SVG efficiency of phototropic devices with an array of elongated bodies under different zenith angles for a theoretical power density of 1-Sun (FIG. 32A) and 2-Sun illumination (FIG. 32B), for some exemplary embodiments of the invention, with a control sample having minor texture but no micropillars (10). FIG. 32C provides a graph showing the SVG of a phototropic material device in accordance with some other exemplary embodiments of the invention having a rGO-incorporated array at a zenith angle of 60° and all azimuthal angles (0° to 360°) for both 1-Sun and 2-Sun systems, compared to a control sample. The zenith angle may be varied to obtain other experimental data. In many embodiments of the invention, under 2-Sun, the device exhibits oblique-loss compensation with wider operational angles, due to the better alignment to the light source under higher illuminating power density.

Figure 33A:
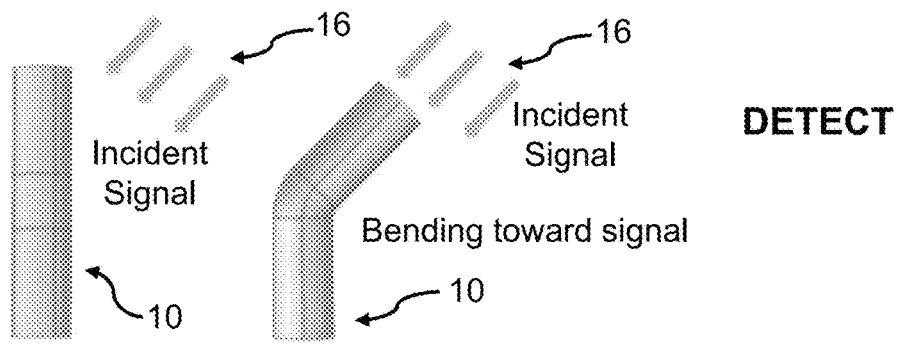
FIGS. 33A-33E provide schematic diagrams of implementations of self-adaptively reconfigurable tropistic material devices in accordance with embodiments of the invention.
Figure 33B:
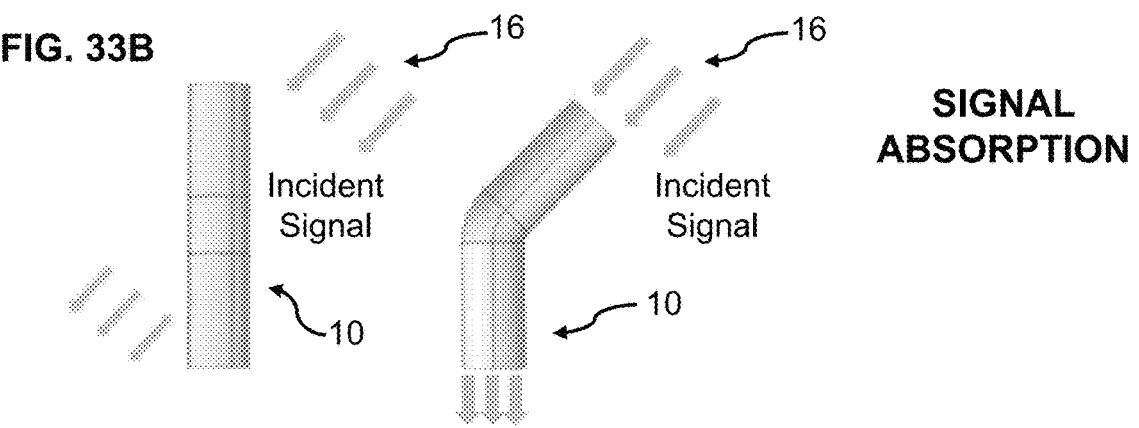
Figure 33C:
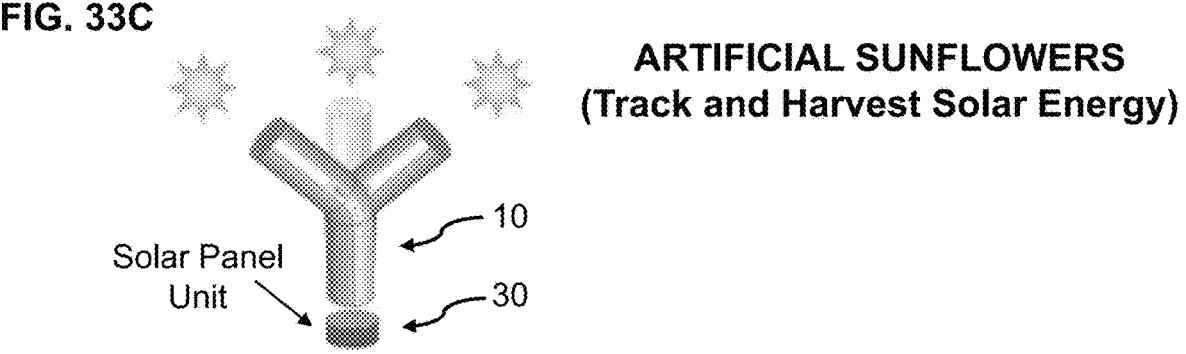
Figure 33D:
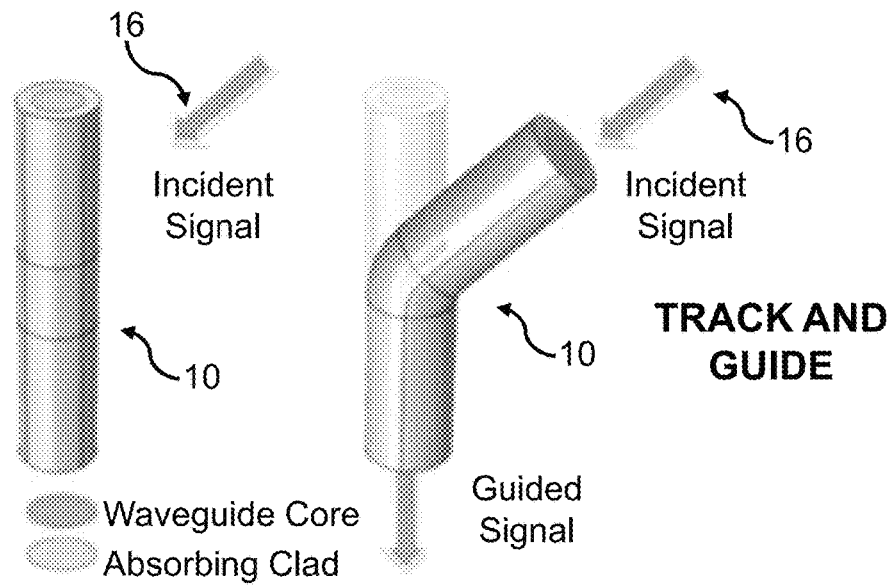
Figure 33E:
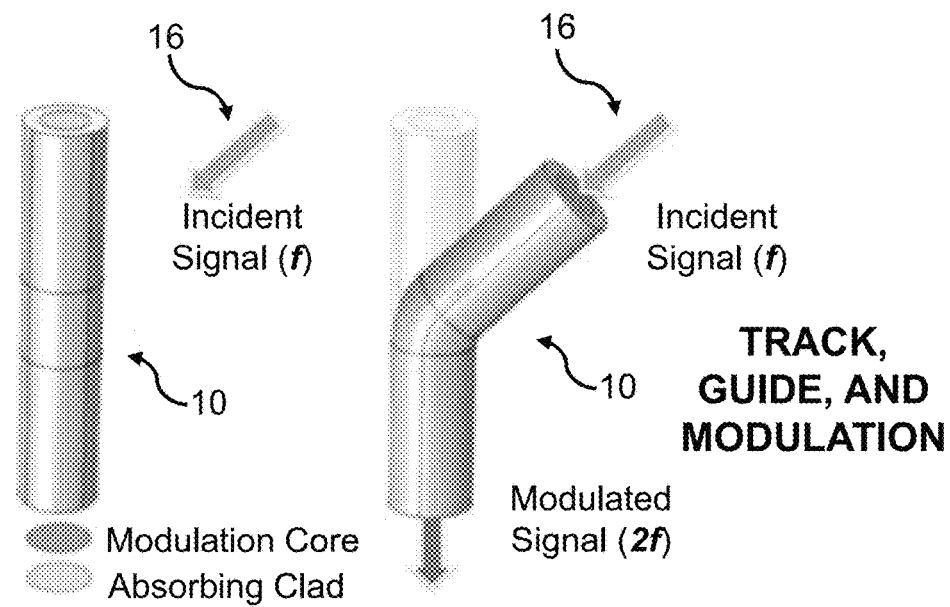

Using the previously described tropistic material systems and associated devices in accordance with embodiments of the invention (both array and non-array), it is possible to implement a number of different functional applications such as detectors, absorbers, waveguides and/or modulators, and receivers and/or harvesters. Many embodiments are directed to detectors capable of working at low-light conditions by orienting microstructure (10) tips towards the incident optical or other signals (16) to minimize the reflection-induced signal loss (as shown in FIG. 33A). Other embodiments are directed to absorbers, which allow for the transfer of the incident energy (16) to thermal energy (18) (as shown in FIG. 33B). An exemplary absorber system, in accordance with embodiments, could employ nanomaterials with plasmon resonance to provide high photonic-to-thermal energy conversion, such as Au nanoparticles and carbon-based nanomaterials. Still other embodiments are directed to implementations of waveguides (as shown in FIG. 33D) and/or modulators (as shown in FIG. 33E) capable of guiding and/or modulating incident energy (16) from a number of different sources, such as, for example, optical, electromagnetic and acoustic waves. Such waveguides play a key role in guiding the energy to the next step, and they can be customized to meet different requirements. In cases of light guiding, the refractive indices and the thicknesses of cladding layers can be tuned based on the maximum bending angle. Besides sole guiding, designing waveguides with different nano/microstructures can further modulate the guided wave to achieve more optimized conditions for the harvested emissions. In addition, liquid crystals (LCs) can be incorporated into the core system to provide effective photonic modulations. Finally, embodiments of receivers and harvesters (as shown in FIG. 33C) may be formed from such material systems and devices that benefit from above-described adaptive tracking capabilities to maximize the collection of the incident photon or other signals (16). Some such systems and devices may further comprise a solar panel unit (30) to act as "artificial sunflowers".

Figure 34A:
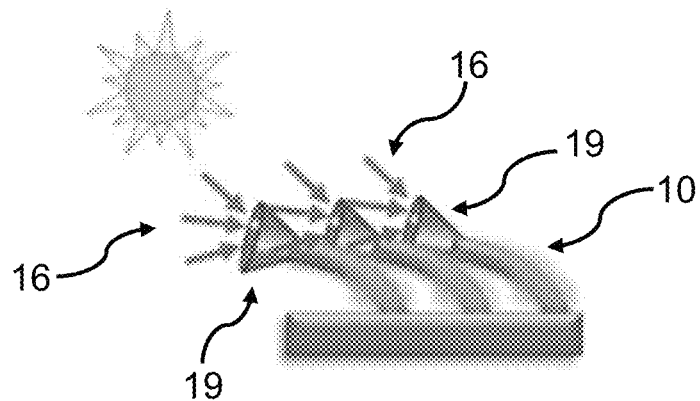
FIGS. 34A-34C provide schematics of an array of cylindrical elongated bodies each having an antenna on its tip, in accordance with yet other embodiments of the invention.
Figure 34B:
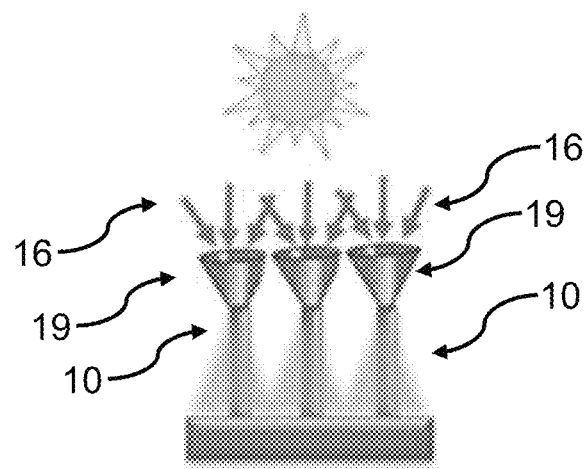
Figure 34C:
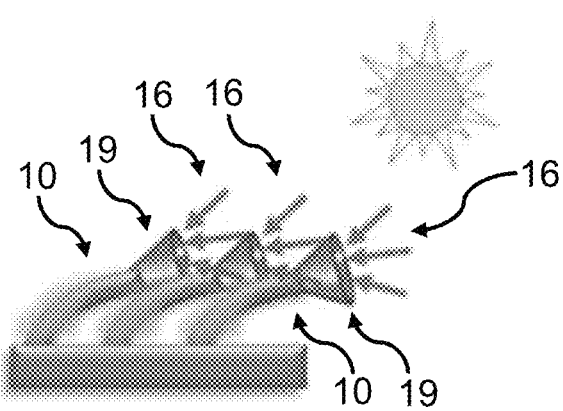

In some other embodiments, a plurality of elongated bodies (10) may be used to support a solar panel and optimize its relative angle to incident light (16). In still other embodiments, the elongated body (10) further comprises an antenna (19) on its tip to maximize photo collection. In some such embodiments, as shown by the schematics in FIGS. 34A-34C, an array of elongated bodies (10) further comprise an antenna (19) on the tip of each elongated body (10), to maximize collection at different incident angles. In some exemplary embodiments, the elongated bodies (10) are stem-like pillars that are of micron to millimeter size. In accordance with yet other embodiments of the invention, the tropistic material system may be used to design and fabricate optical fibers or antenna to enhance collection of emissions. In accordance with still other embodiments of the invention, the tropistic material system may be used to design and fabricate soft variable-angle micro-waveguides, smart windows, artificial leaves, solar panels, or fuel cells.

By rationally designing the aspects described above, tropistic systems in accordance with embodiments of the invention can perform several functions to achieve a variety of applications. For example, the distribution of absorbers in the waveguides and/or modulators can be varied to satisfy different demands. To make it to function as a waveguide, the absorbers can be evenly distributed in the whole material structure, when the absorbers are designed to respond to unwanted frequencies of the incident energy. The waveguide (with absorbers) is still "clear", or transparent, to the frequency ranges that are desired to be harvested or sensed. In another embodiment, when all of the incident frequencies are required to be guided through the waveguide, the absorbers can be designed with specific distributions inside the waveguide to induce the tracking effect while the rest of the waveguide (without any absorbers) performs the light guiding function.

Based on above mentioned basic functions, implementations of the tropistic material system in accordance with embodiments also include several additional examples of potential application, including photonic absorbers and selective filters, and optical diodes, as described below.

Photonic Absorbers and Filters

As discussed above, by marrying plasmon-resonance photonic absorbers (14) (e.g., AuNPs) and thermo-mechanical responsive hydrogels (12) in accordance with embodiments, it is possible to provide nanocomposites with rationally designed geometrical features that can effectively bend and consequently track an incident emissive source, such as, for example, light. In such embodiments, the nanocomposite would effectively absorb the incident photonic energy (16) and dissipate it into thermal energy (18). Thus, a self-adaptive angular-definitive photonic absorber can be achieved. In an all-optical system, it is of great importance to absorb/filter certain space light (with specific wavelengths) in order to prevent the cross-talk between closely packed functional units in the photonic circuits. Currently, there exists no photonic absorber/filter that is capable to self-adapt and absorb/filter the selective wavelengths as designed. The disclosed hydrogel-absorber material system, according to embodiments, would provide a unique tool to allow for the design of intelligent, all-optical systems and devices.

Optical Logic Devices

Figure 35A:
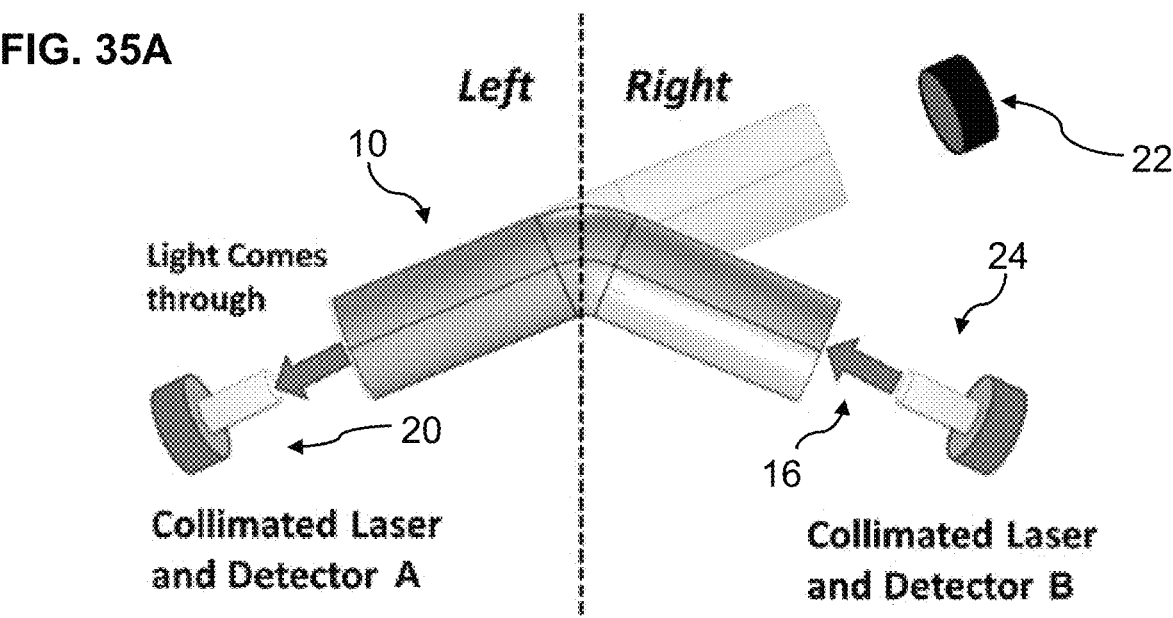
FIGS. 35A and 35B provide schematic diagrams of self-adaptive optical diode in accordance with embodiments of the invention.
Figure 35B:
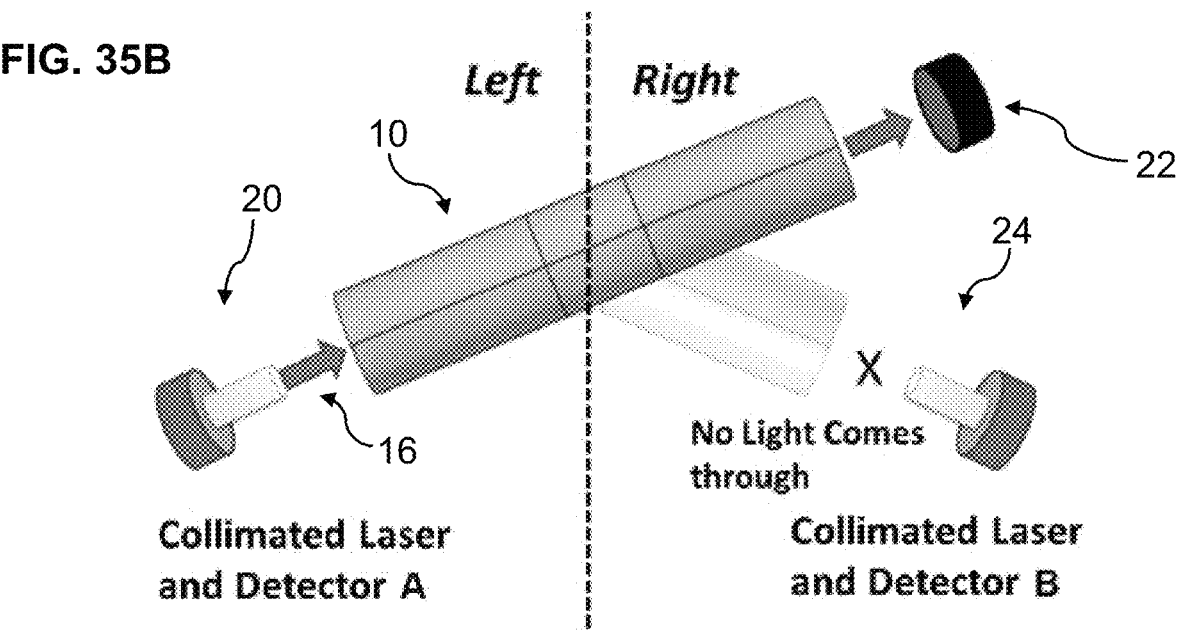

Optical logic devices are key components to all-optical circuits, silicon photonics and photonic computers. As a simple analogy to its electronic counterparts, an optical diode is one of the several fundamental optical logic devices. The disclosed self-adaptive optical diode operates as described in FIGS. 35A and 35B. In such embodiments, a phototropic pillar (10), which comprises a light absorbing sidewall (cladding) and a light guiding core, is fabricated on the top of a laser A (20) and positioned to point at a light absorber (22). A second laser B (24) shines a beam on the sidewall of the pillar (10) with an angle $\neq 90°$. The phototropic pillar (10), in accordance with embodiments, will bend to track the emission (16) of laser B with its tip, then consequently guide the photonic energy from laser A (20) to laser B (24) and form a "forward-biased" on state from right to left (FIG. 35A). When laser B (24) is off, and laser A (20) is on, the laser beam (16) from laser A (20) shines at the center of the bottom of the pillar, but causes no bending effect. The photonic energy (16) will miss the target of laser B (24) owing to the bending recovery of the hydrogel pillar (10). As a result, a "reverse-biased" off state, from left to right, is thus formed (FIG. 35B). The principle of operation lies in the self-adaptive and photo-thermal responsive function inherited from the hydrogels (12) and absorbers (14). Researchers have reported that diodes can be achieved by optics nonlinearity, which relies on redundant magnetic, mechanical or electric fields to introduce. Furthermore, it is proved that it can also be achieved by breaking time reversal symmetry in a linear optical system, by designing and fabricating a complicated artificial nanostructure. In contrast, the disclosed hydrogel-based material system in accordance with embodiments provides a simple and reliable route to design an optical diode, or one-way waveguide. This optical diode design requires no complicated nanofabrication and is wavelength and polarization state independent. It operates based on simple linear optics and is easily scalable. The system, in accordance with embodiments of the invention, provides an active (self-adaptive) and, to some extent, passive (requires no other energy input) solution to all optical logic devices.

It should be understood that the above embodiments and limitations are provided as exemplary; other configurations or materials may be utilized without departing from the scope of the disclosure. A person skilled in the art will recognize that additional embodiments according to the invention are contemplated as being within the scope of the foregoing generic disclosure, and no disclaimer is in any way intended by the foregoing, non-limiting, examples.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. A tropistic device comprising:
   at least one elongated body comprised of at least one responsively deformable polymeric material having at least one absorber material dispersed therein;
   wherein the at least one responsively deformable polymeric material undergoes a local expansion or contraction when subjected to a specific energetic stimulus, said expansion or contraction causing a deformation of the at least one elongated body;

wherein the at least one absorber material is configured to transform an incident energetic impulse into the specific energetic stimulus;

wherein the specific energetic stimulus causes a local temperature where the deformation occurs; and wherein the at least one elongated body has a threshold temperature, and a built-in feedback loop, wherein the local expansion reverses when the local temperature is above the threshold temperature, and the contraction reverses when the local temperature is below the threshold temperature.

2. The tropistic device of claim 1, wherein the incident energetic impulse is selected from the group consisting of thermal energy, electromagnetic waves, acoustics waves, magnetic fields, or photonic emissions.

3. The tropistic device of claim 1, wherein the at least one responsively deformable polymeric material is selected from the group consisting of poly(N-isopropylacrylamide) (PNIPAAm), poly(acrylic acid-co-acrylamide), poly(2-dimethylaminoethyl methacrylate) (PDMAEMA), liquid crystalline elastomer (LCE), or azobenzene/spiropyran-based polymer.

4. The tropistic device of claim 1, wherein the at least one absorber material is selected from the group consisting of gold nanoparticles, carbon-based material, metallic nanoparticles, or magnetic nanoparticles.

5. The tropistic device of claim 1, wherein the at least one elongated body has one of either a pillar or cylindrical shape.

6. The tropistic device of claim 1, wherein the device has an equilibrium state, wherein an incident energetic impulse stops causing deformation of the at least one elongated body.

7. The tropistic device of claim 1, wherein the incident energetic impulse causes deformation of the at least one elongated body at an incident zenith angle range of greater than 0° to 150°, and the at least one elongated body tracks the incident energetic impulse with an error of less than 0.5%.

8. The tropistic device of claim 1, wherein the at least one responsively deformable polymeric material has a pore size of 10 microns or less.

9. The tropistic device of claim 1, wherein the at least one elongated body has a height of 1 cm or less.

10. The tropistic device of claim 1, wherein a plurality of the elongated bodies are arranged in an array.

11. The tropistic device of claim 1, wherein the device is selected from the group consisting of:

a detector and wherein the elongated body has first and second ends wherein the deformation is such that a position of at least one of the first and second ends is altered such that the incident energetic impulse is incident thereon;

a thermal absorber and wherein the elongated body has first and second ends wherein the specific energetic stimulus is thermal energy;

a waveguide and wherein the elongated body has first and second ends, and a cladding layer disposed on an outer surface thereof wherein the cladding layer has a refractive index configured to guide the incident energetic impulse through along the elongated body; and an optical diode and wherein the elongated body has first and second ends, and a cladding layer disposed on an outer surface thereof, and wherein the device further comprises:

a first light source disposed in relation to the first end such that an energetic emission from the first light source is incident upon the first end;

a second light source disposed in relation to the elongated body such that an energetic emission from the second light source is incident upon at least one portion of the elongated body;

wherein the absorber material is configured to transform an incident energetic impulse from the second light source into the specific energetic stimulus; and wherein the cladding layer has a refractive index configured to guide the incident energetic impulse through along the elongated body.

* * * * *